United States Patent
Yao et al.

(10) Patent No.: US 10,856,218 B2
(45) Date of Patent: Dec. 1, 2020

(54) NETWORK SELECTION SYSTEM AND METHOD FOR ESTABLISHMENT OF INTER-NETWORKING SESSION

(71) Applicant: Huawei Technologies Co., Ltd., Shenzhen (CN)

(72) Inventors: Qi Yao, Shenzhen (CN); Shufeng Shi, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/584,242

(22) Filed: Sep. 26, 2019

(65) Prior Publication Data
US 2020/0022076 A1 Jan. 16, 2020

Related U.S. Application Data

(63) Continuation of application No. PCT/CN2019/082963, filed on Apr. 17, 2019.

(30) Foreign Application Priority Data

May 8, 2018 (CN) .......................... 2018 1 0432656
May 18, 2018 (CN) .......................... 2018 1 0481106

(51) Int. Cl.
*H04W 48/18* (2009.01)
*H04W 76/10* (2018.01)
(Continued)

(52) U.S. Cl.
CPC .......... *H04W 48/18* (2013.01); *H04M 15/66* (2013.01); *H04W 8/02* (2013.01); *H04W 8/18* (2013.01);
(Continued)

(58) Field of Classification Search
CPC ....... H04W 48/18; H04W 76/10; H04W 8/02; H04W 8/22; H04W 8/18; H04W 72/04;
(Continued)

(56) References Cited

U.S. PATENT DOCUMENTS 10,306,580 B1* 5/2019 Gupta ................. H04W 60/005
2010/0284333 A1* 11/2010 Shirota et al. ................ 370/328
(Continued)

FOREIGN PATENT DOCUMENTS

CN 101277521 A 10/2008
CN 107018542 A 8/2017
(Continued)

OTHER PUBLICATIONS

Machine Translation and Abstract of Chinese Publication No. CN101277521, Oct. 1, 2008, 37 pages.
(Continued)

*Primary Examiner* — Meless N Zewdu
(74) *Attorney, Agent, or Firm* — Conley Rose, P.C.

(57) ABSTRACT

A network element selection method and apparatus, where the method includes: receiving, by a first network element in a first communications system, a first message from a terminal device, wherein the first message is used to request to establish a session; and in response to the first message, determining, by the first network element in the first communications system, a target session management function network element based on a capability of the terminal device and third subscription information of the terminal device. According to the method, a terminal device that supports a 4G system and a 5G system and that has no interworking requirement can properly select a network element.

33 Claims, 8 Drawing Sheets

(51) Int. Cl.
  *H04M 15/00* (2006.01)
  *H04W 8/02* (2009.01)
  *H04W 8/18* (2009.01)
  *H04W 8/22* (2009.01)
  *H04W 72/04* (2009.01)
  *H04W 84/04* (2009.01)

(52) U.S. Cl.
  CPC ............. *H04W 8/22* (2013.01); *H04W 72/04* (2013.01); *H04W 76/10* (2018.02); *H04W 84/042* (2013.01)

(58) Field of Classification Search
  CPC ............... H04W 80/10; H04W 36/011; H04W 36/0033; H04W 36/08; H04W 36/32; H04W 36/0016; H04W 84/042; H04W 36/0022; H04W 36/0027; H04W 76/11; H04W 76/15; H04W 76/16; H04W 88/00; H04W 88/02; H04W 88/08; H04W 88/18; H04W 88/12; H04W 88/184; H04W 92/10; H04W 92/20; H04W 8/24; H04W 8/16; H04W 8/205; H04W 8/00; H04W 48/17; H04W 48/00; H04W 48/20; H04W 36/0011; H04W 76/00; H04W 84/045; H04W 4/60; H04W 4/70; H04W 4/80; H04M 15/00; H04M 15/66; H04M 15/63; H04M 3/42365; H04L 51/06; H04L 67/148; H04L 67/14; H04L 67/141; H04L 67/142

See application file for complete search history.

(56) References Cited

U.S. PATENT DOCUMENTS

| | | | | |
|---|---|---|---|---|
| 2012/0165061 | A1* | 6/2012 | Tu ................................. | 455/418 |
| 2018/0199243 | A1* | 7/2018 | Bharatia ........... | H04W 36/0022 |
| 2019/0212724 | A1* | 7/2019 | Phuyal et al. ....... | G05D 1/0022 |
| 2019/0289650 | A1* | 9/2019 | Yoo et al. ............. | H04W 76/12 |
| 2019/0306251 | A1* | 10/2019 | Talebi et al. .......... | H04L 67/141 |
| 2019/0313468 | A1* | 10/2019 | Talebi et al. .......... | H04W 76/12 |
| 2019/0335534 | A1* | 10/2019 | Atarius et al. ........ | H04W 80/10 |
| 2019/0380063 | A1* | 12/2019 | Hu et al. ............... | H04W 28/08 |
| 2019/0394684 | A1* | 12/2019 | Li et al. ............ | H04W 36/0022 |

FOREIGN PATENT DOCUMENTS

| | | |
|---|---|---|
| CN | 107889175 A | 4/2018 |
| WO | 2015182111 A1 | 12/2015 |

OTHER PUBLICATIONS

Machine Translation and Abstract of Chinese Publication No. CN107018542, Aug. 4, 2017, 32 pages.
Machine Translation and Abstract of Chinese Publication No. CN107889175, Apr. 6, 2018, 26 pages.
3GPP TS 23.401, V15.3.0, "3rd Generation Partnership Project; Technical Specification Group Services and System Aspects; General Packet Radio Service (GPRS) enhancements for Evolved Universal Terrestrial Radio Access Network (E-UTRAN) access (Release 15)," Mar. 2018, 405 pages.
3GPP TS 23.501, V15.1.0, "3rd Generation Partnership Project; Technical Specification Group Services and System Aspects; System Architecture for the 5G System; Stage 2 (Release 15)," Mar. 2018, 201 pages.
3GPP TS 23.502, V15.1.0, "3rd Generation Partnership Project; Technical Specification Group Services and System Aspects; Procedures for the 5G System; Stage 2 (Release 15)," Mar. 2018, 285 pages.
S2-174293, Huawei, "Update of 4G to 5G interworking handover with Nx interface," SA WG2 Meeting #122, San Jose del Cabo, Mexico, Jun. 26-30, 2017, 11 pages.
S2-182949, Huawei, "Select the same SMF+UPF for PDU sessions of the same DNN within one slice," 3GPP TSG-SA WG2 Meeting #126, Montreal, Canada, Feb. 26-Mar. 2, 2018, 4 pages.
S2-184485, ZTE, et al.,"Solution on reusing the mechanism in EPS SRVCC to enable the 5G SRVCC," SS WG2 Meeting #127, Sanya, China, Apr. 16-20, 2018, 5 pages.
Foreign Communication From a Counterpart Application, PCT Application No. PCT/CN2019/082963, English Translation of International Search Report dated Jul. 17, 2019, 2 pages.
R2-168569, Huawei, "Cell selection for NR non-standalone and NR standalone UE operation," 3GPP TSG-RAN WG2 Meeting #96, Reno, Nevada, US, Nov. 14-18, 2016, 4 pages.
S2-134328, "Discussion on Core Network Type Selection based on the Subscription Information—Report of Offline Discussion,"TSG SA WG2#100, San Francisco, USA, Nov. 11-15, 2013, 26 pages.
S2-143063, Ericsson, "P-CR on Subscription information for DECOR," SA WG2 Meeting #105, Oct. 13-17, 2014, Sapporo,Japan, 3 pages.
S2-173944, Kddi, et al., "TS 23.501 clause 5.17.2.1 PGW Selection based on UE Network Capability for 5G UE," SA WG2 Meeting #121, May 15-19, 2017, Hanazhou. P. R. China, 3 pages.
C4-183286, Nokia, et al., "Selection of a combined PGW/SMF for interworking with 5GS," 3GPP TSG CT4 Meeting #84, KunMing, P.R. China; Apr. 16-20, 2018, 5 pages.
S2-181575, Huawei, et al., "Correction on PCF selection in SMF," 3GPP TSG-SA2 Meeting #126, Montreal, Canada, Feb. 26-Mar. 2, 2018, 14 pages.
S2-182254, Huawei, et al., "Select the same SMF+UPF for PDU sessions of the same DNN within one slice," 3GPP TSG-SA WG2 Meeting #126, Montreal, Canada, Feb. 26-Mar. 2, 2018, 4 pages.
S2-183468, LG Electronics, "Clarification on SMF selection," SA WG2 Meeting #S2-127, Apr. 16-20, 2018, Sanya, P. R. China, 6 pages.

* cited by examiner

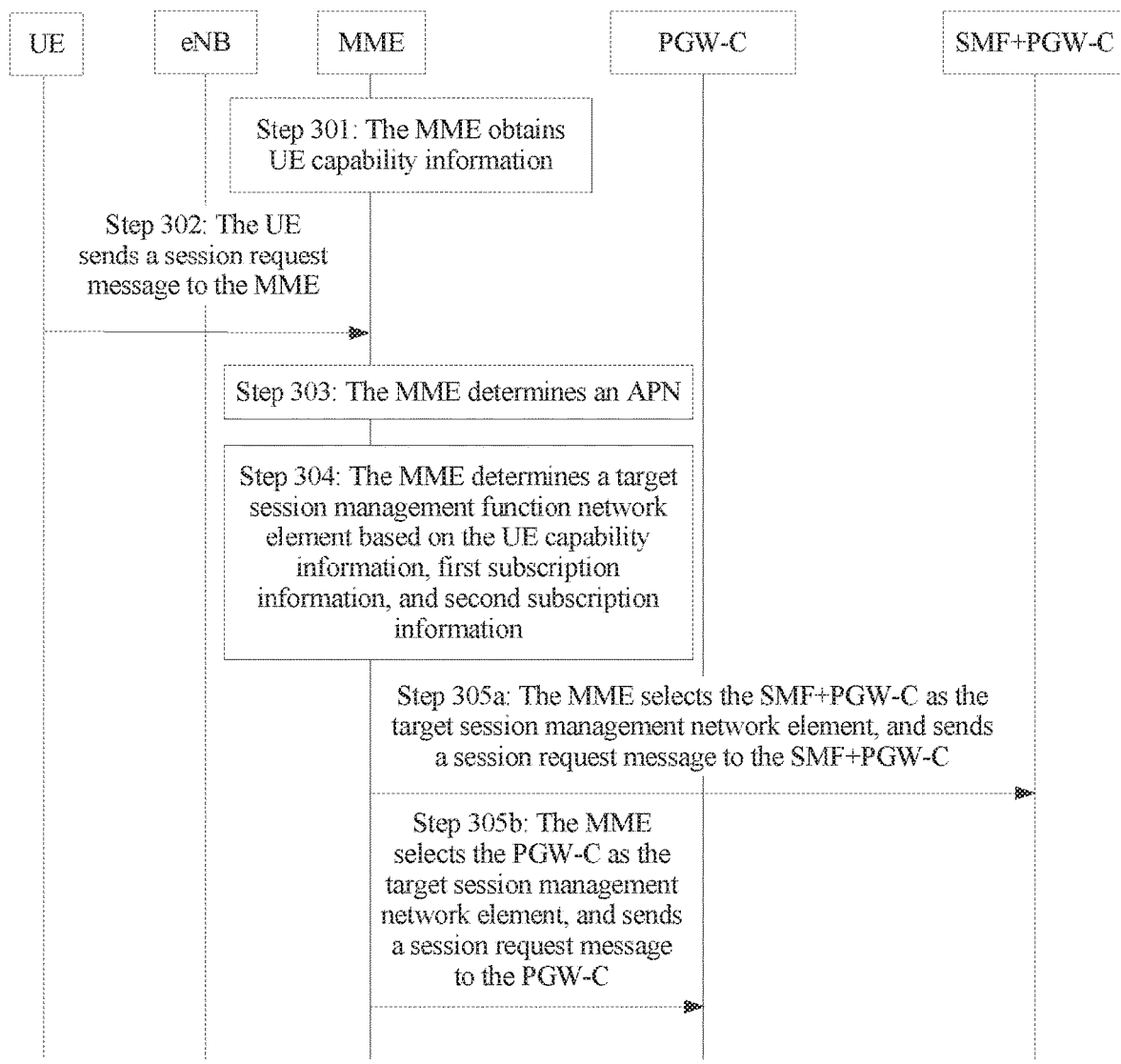

NETWORK SELECTION SYSTEM AND METHOD FOR ESTABLISHMENT OF INTER-NETWORKING SESSION

CROSS-REFERENCE TO RELATED APPLICATIONS

This application is a continuation of International Patent Application No. PCT/CN2019/082963, filed on Apr. 17, 2019, which claims priority to Chinese Patent Application No. 201810432656.9, filed on May 8, 2018 and entitled "NETWORK ELEMENT SELECTION METHOD AND APPARATUS", and Chinese Patent Application No. 201810481106.6, filed on May 18, 2018 and entitled "NETWORK ELEMENT SELECTION METHOD AND APPARATUS", all of which are incorporated herein by reference in their entireties.

TECHNICAL FIELD

This application relates to the field of wireless communications technologies, and in particular, to a network element selection method and apparatus.

BACKGROUND

As communications technologies quickly develop, a 5th generation (5G) mobile communications technology emerges. At an early stage of network deployment, because of insufficient coverage of a 5G network, when a location of a user equipment (UE) changes, a session of the UE needs to be handed over between the 5G network and a 4th generation (4G) network.

In other approaches, as shown in FIG. 1, when a UE accesses a 4G system, if a mobility management entity (MME) determines that the UE can support the 4G system and a 5G system, the MME selects a co-located session management function network element for the UE to establish a connection. However, in some scenarios, the UE does not need to use a service of a 5G network or does not subscribe to a service of a 5G network. In other words, the UE supporting the 4G system and the 5G system has no interworking requirement. Therefore, in this case, the MME does not need to select a co-located session management function network element for the UE.

Therefore, a network element is improperly selected in the foregoing case, and relatively heavy load of the co-located session management function network element may be caused.

SUMMARY

Embodiments of this application provide a network element selection method and apparatus, such that UE that supports a 4G system and a 5G system and that has no interworking requirement can properly select a network element.

According to a first aspect, this application provides a network element selection method. The method includes: receiving, by a first network element in a first communications system, a first message from a terminal device, where the first message is used to request to establish a session; and in response to the first message, determining, by the first network element in the first communications system, a target session management function network element based on first subscription information and second subscription information, where the first subscription information includes subscription information of the terminal device in the first communications system, and the second subscription information includes subscription information of the terminal device in a second communications system.

Therefore, the first network element in the first communications system can select a suitable network element as the target session management function network element based on the first subscription information and the second subscription information. Compared with selecting a network element based only on whether the terminal device supports a 4G system and a 5G system in other approaches, a terminal device that supports the 4G system and the 5G system and that has no interworking requirement can properly select a network element. This way, load of a co-located session management function network element can be reduced.

Optionally, the first subscription information may be subscription information corresponding to one or more data network identities of the terminal device in the first communications system. The second subscription information may also be subscription information corresponding to one or more data network identities of the terminal device in the second communications system. Alternatively, the first subscription information may be indication information that indicates whether the terminal device subscribes to a data network identity in the first communications system, and the second subscription information may also be indication information that indicates whether the terminal device subscribes to a data network identity in the second communications system.

In a possible design, the determining, by the first network element in the first communications system, a target session management function network element based on first subscription information and second subscription information may comprise determining the target session management function network element based on a capability of the terminal device, the first subscription information, and the second subscription information.

Therefore, the first network element in the first communications system may determine the target session management function network element with reference to the capability of the terminal device, the first subscription information, and the second subscription information.

In a possible design, the first communications system is a 4G system, the second communications system is a 5G system, and the first network element in the first communications system is an MME. When the first network element in the first communications system determines the target session management function network element based on the capability of the terminal device, the first subscription information, and the second subscription information, if the terminal device supports the first communications system and the second communications system, and both the first subscription information and the second subscription information include subscription information corresponding to a data network identity of the session, the MME selects a co-located session management function network element as the target session management network element. Further, a network element having a session management capability of the 5G system and a session management capability of the 4G system is the co-located session management function network element.

Therefore, the MME may select the co-located session management function network element as the target session management function network element for a terminal device having both an interworking capability and an interworking requirement.

In a possible design, the first communications system is a 4G system, the second communications system is a 5G system, and the first network element in the first communications system is an MME. When the first network element in the first communications system determines the target session management function network element based on the capability of the terminal device, the first subscription information, and the second subscription information, if the terminal device supports the first communications system and the second communications system, the first subscription information includes subscription information corresponding to a data network identity of the session, and the second subscription information does not include the subscription information corresponding to the data network identity of the session, the MME selects a session management function network element in the 4G system as the target session management network element.

Therefore, the MME may select the session management function network element in the 4G system as the target session management network element for a terminal device having an interworking capability but having no interworking requirement. That is, the terminal device does not need to use a service of a 5G network or does not subscribe to a service of a 5G network. In this way, a session requirement can be met, such that load of a co-located session management function network element can be reduced.

In a possible design, the first communications system is a 5G system, the second communications system is a 4G system, and the first network element in the first communications system is an AMF. When the first network element in the first communications system determines the target session management function network element based on the capability of the terminal device, the first subscription information, and the second subscription information, if the terminal device supports the first communications system and the second communications system, and both the first subscription information and the second subscription information include subscription information corresponding to a data network identity of the session, the AMF selects a co-located session management function network element as the target session management network element, where a network element having a session management capability of the 5G system and a session management capability of the 4G system is the co-located session management function network element.

Therefore, the AMF may select the co-located session management function network element as the target session management function network element for a terminal device having both an interworking capability and an interworking requirement.

In a possible design, the first communications system is a 5G system, the second communications system is a 4G system, and the first network element in the first communications system is an AMF. When the first network element in the first communications system determines the target session management function network element based on the capability of the terminal device, the first subscription information, and the second subscription information, if the terminal device supports the first communications system and the second communications system, the first subscription information includes subscription information corresponding to a data network identity of the session, and the second subscription information does not include the subscription information corresponding to the data network identity of the session, the AMF selects a session management function network element in the 5G system as the target session management network element.

Therefore, the AMF may select the session management function network element in the 5G system as the target session management network element for a terminal device having an interworking capability but having no interworking requirement. That is, the terminal device does not need to use a service of a 4G network or does not subscribe to a service of a 4G network. In this way, a session requirement can be met, such that load of a co-located session management function network element can be reduced.

In a possible design, the method further includes sending, by the first network element in the first communications system, a second message to the target session management function network element, such that the target session management function network element determines a policy control network element and a charging system based on the second message.

Optionally, the second message includes instruction information instructing the target session management function network element to select a co-located policy control network element and a co-located charging system, or a policy control network element and a charging system that are in the first communications system. When the first communications system is a 4G system, the second communications system is a 5G system, and the first network element in the first communications system is an MME, the MME may instruct, using the second message, a co-located session management function network element to select a policy control network element and a charging system that are in the 4G system for a terminal device having an interworking capability but having no interworking requirement. That is, the terminal device does not need to use a service of a 5G network or does not subscribe to a service of a 5G network, such that load of the co-located policy control network element and load of the co-located charging system can be reduced. When the first communications system is a 5G system, the second communications system is a 4G system, and the first network element in the first communications system is an AMF, the AMF may instruct, using the second message, a co-located session management function network element to select a policy control network element and a charging system that are in the 5G system for a terminal device having an interworking capability but having no interworking requirement. That is, the terminal device does not need to use a service of a 4G network or does not subscribe to a service of a 4G network, such that load of the co-located policy control network element and load of the co-located charging system can be reduced.

According to a second aspect, this application provides another network element selection method, and the method includes: receiving, by a first network element in a first communications system, a first message from a terminal device, where the first message is used to request to establish a session; and in response to the first message, determining, by the first network element in the first communications system, a target session management function network element based on a capability of the terminal device and third subscription information of the terminal.

Therefore, the first network element in the first communications system can select a suitable network element as the target session management function network element based on the third subscription information of the terminal. Compared with selecting a network element based only on whether the terminal device supports a 4G system and a 5G system in other approaches, a terminal device that supports the 4G system and the 5G system and that has no interworking requirement can properly select a network element, and load of a co-located session management function network element can be reduced.

In a possible design, the first communications system is a 4G system, the second communications system is a 5G system, and the first network element in the first communications system is an MME. The third subscription information of the terminal may be indication information indicating whether a data network identity (e.g., an access point name (APN)) corresponding to the session supports interworking with the 5G system (or referred to as a 5G core (5GC)). Optionally, the indicating whether a data network identity APN corresponding to the session supports interworking with the 5G system (or referred to as a 5GC) further includes: The third subscription information of the terminal is indication information indicating whether the data network identity APN corresponding to the session supports interworking with a DNN and a network slice selection assistance identification (NSSAI) or single NSAAI (S-NSSAI). The determining, by the first network element in the first communications system, a target session management function network element based on a capability of the terminal device and third subscription information of the terminal includes: if the terminal device supports the first communications system and the second communications system, and the third subscription information of the terminal indicates that a data network identity APN corresponding to the session supports interworking with the 5G system, selecting, by the MME, a co-located session management function network element as the target session management network element. The co-located session management function network element may be a network element having both a session management capability of the 4G system and a session management capability of the 5G system, for example, a session management function (SMF)+Packet Data Network (PDN) Gateway-Control (PGW-C) (SMF+PGW-C). Therefore, the MME may select the co-located session management function network element as the target session management function network element for a terminal device having both an interworking capability and an interworking requirement.

In a possible design, the first communications system is a 4G system, the second communications system is a 5G system, and the first network element in the first communications system is an MME. The third subscription information of the terminal may be indication information indicating whether a data network identity APN corresponding to the session supports interworking with the 5G system (or referred to as a 5GC). Optionally, indicating whether a data network identity APN corresponding to the session supports interworking with the 5G system (or referred to as a 5GC) further includes: The third subscription information of the terminal is indication information indicating whether the data network identity APN corresponding to the session supports interworking with a DNN and a network slice identification S-NSSAI. The determining, by the first network element in the first communications system, a target session management function network element based on a capability of the terminal device and third subscription information of the terminal includes: if the terminal device supports the first communications system and the second communications system, and the third subscription information indicates that a data network identity APN of the session does not support interworking with the 5G system, skipping, by the MME, selecting a co-located session management function network element as the target session management network element. The skipping, by the MME, selecting a co-located session management function network element as the target session management network element includes selecting, by the MME as the target session management network element, a session management function network element that is not specially used for interworking. Therefore, the MME may select a session management function network element in the 4G system as the target session management network element for a terminal device having an interworking capability but having no interworking requirement. That is, an APN that does not support interworking with 5G. In this way, a session requirement can be met, such that load of the co-located session management function network element can be reduced.

In a possible design, the first communications system is a 5G system, the second communications system is a 4G system, and the first network element in the first communications system is an AMF. The third subscription information of the terminal may be indication information indicating whether a data network identity (e.g., a data network name (DNN)) corresponding to the session supports interworking with the 4G system (or referred to as an Evolved Packet System (EPS)). Optionally, the indicating whether a data network identity DNN corresponding to the session supports interworking with the 4G system (or referred to as an EPS) further includes: The third subscription information of the terminal is indication information indicating whether the data network identity DNN and a network slice identification S-NSSAI that correspond to the session support interworking with 4G (or referred to as an EPS). The determining, by the first network element in the first communications system, a target session management function network element based on a capability of the terminal device and third subscription information of the terminal includes: if the terminal device supports the first communications system and the second communications system, and the third subscription information of the terminal indicates that a data network identity DNN corresponding to the session supports interworking with the 4G system (or referred to as an EPS), selecting, by the AMF, a co-located session management function network element as the target session management network element. The co-located session management function network element may be a network element having both a session management capability of the 5G system and a session management capability of the 4G system, for example, an SMF+PGW-C. Therefore, the AMF may select the co-located session management function network element as the target session management function network element for a terminal device having both an interworking capability and an interworking requirement.

In a possible design, the first communications system is a 5G system, the second communications system is a 4G system, and the first network element in the first communications system is an AMF. The third subscription information of the terminal may be indication information indicating whether a data network identity DNN corresponding to the session supports interworking with the 4G system (or referred to as an EPS). Optionally, the indicating whether a data network identity DNN corresponding to the session supports interworking with the 4G system (or referred to as an EPS) further includes: The third subscription information of the terminal is indication information indicating whether the data network identity DNN and a network slice identification S-NSSAI that correspond to the session support interworking with 4G (or referred to as an EPS). The determining, by the first network element in the first communications system, a target session management function network element based on a capability of the terminal device and third subscription information of the terminal includes:

if the terminal device supports the first communications system and the second communications system, and the third subscription information indicates that a data network identity DNN of the session does not support interworking with the 4G system, skipping, by the AMF, selecting a co-located session management function network element as the target session management network element. The skipping, by the AMF, selecting a co-located session management function network element as the target session management network element includes selecting, by the AMF as the target session management network element, a session management function network element that is not specially used for interworking. Therefore, the AMF may select a session management function network element in the 5G system as the target session management network element for a terminal device having an interworking capability but having no interworking requirement (that is, a DNN that does not support interworking with 4G). In this way, a session requirement can be met, such that load of the co-located session management function network element can be reduced.

In a possible design, the method further includes sending, by the first network element in the first communications system, a second message to the target session management function network element, such that the target session management function network element determines a policy control network element and a charging system based on the second message.

Optionally, the second message includes instruction information instructing the target session management function network element to select a co-located policy control network element and a co-located charging system, or a policy control network element and a charging system that are in the first communications system. When the first communications system is a 4G system, the second communications system is a 5G system, and the first network element in the first communications system is an MME, the MME may instruct, using the second message, a co-located session management function network element to select a policy control network element and a charging system that are in the 4G system for a terminal device having an interworking capability but having no interworking requirement. That is, the terminal device does not need to use a service of a 5G network or does not subscribe to a service of a 5G network, such that load of the co-located policy control network element and load of the co-located charging system can be reduced. When the first communications system is a 5G system, the second communications system is a 4G system, and the first network element in the first communications system is an AMF, the AMF may instruct, using the second message, a co-located session management function network element to select a policy control network element and a charging system that are in the 5G system for a terminal device having an interworking capability but having no interworking requirement. That is, the terminal device does not need to use a service of a 4G network or does not subscribe to a service of a 4G network, such that load of the co-located policy control network element and load of the co-located charging system can be reduced.

According to a third aspect, a network element selection apparatus is provided. The apparatus includes: a receiving unit configured to receive a first message from a terminal device, where the first message is used to request to establish a session; and a processing unit configured to: in response to the first message, determine a target session management function network element based on first subscription information and second subscription information, where the first subscription information includes subscription information of the terminal device in a first communications system, and the second subscription information includes subscription information of the terminal device in a second communications system.

In a possible design, the processing unit is configured to determine the target session management function network element based on a capability of the terminal device, the first subscription information, and the second subscription information.

In a possible design, the first communications system is a 4G system, the second communications system is a 5G system, and the apparatus is an MME. The processing unit is configured to: if the terminal device supports the first communications system and the second communications system, and both the first subscription information and the second subscription information include subscription information corresponding to a data network identity of the session, select a co-located session management function network element as the target session management network element, where a network element having a session management capability of the 5G system and a session management capability of the 4G system is the co-located session management function network element.

In a possible design, the first communications system is a 4G system, the second communications system is a 5G system, and the apparatus is an MME. The processing unit is configured to: if the terminal device supports the first communications system and the second communications system, the first subscription information includes subscription information corresponding to a data network identity of the session, and the second subscription information does not include the subscription information corresponding to the data network identity of the session, select a session management function network element in the 4G system as the target session management network element.

In a possible design, the first communications system is a 5G system, the second communications system is a 4G system, and the apparatus is an AMF. The processing unit is configured to: if the terminal device supports the first communications system and the second communications system, and both the first subscription information and the second subscription information include subscription information corresponding to a data network identity of the session, select a co-located session management function network element as the target session management network element, where a network element having a session management capability of the 5G system and a session management capability of the 4G system is the co-located session management function network element.

In a possible design, the first communications system is a 5G system, the second communications system is a 4G system, and the apparatus is an AMF. The processing unit is configured to: if the terminal device supports the first communications system and the second communications system, the first subscription information includes subscription information corresponding to a data network identity of the session, and the second subscription information does not include the subscription information corresponding to the data network identity of the session, select a session management function network element in the 5G system as the target session management network element.

In a possible design, the apparatus further includes a sending unit configured to send a second message to the target session management function network element, such that the target session management function network element determines a policy control network element and a charging system based on the second message.

A fourth aspect of the present disclosure discloses another network element selection apparatus. The apparatus includes: a receiving unit configured to receive a first message from a terminal device, where the first message is used to request to establish a session; and a processing unit configured to: in response to the first message, determine a target session management function network element based on a capability of the terminal device and third subscription information of the terminal.

In a possible implementation, the first communications system is a 5G system, the second communications system is a 4G system, and the network element selection apparatus is an access and mobility management function network element AMF in the 5G system. The processing unit is configured to: if the terminal device supports the first communications system and the second communications system, and the third subscription information of the terminal indicates that a data network identity DNN corresponding to the session supports interworking with the 4G system, select a co-located session management function network element as the target session management network element.

In a possible implementation, the first communications system is a 5G system, the second communications system is a 4G system, and the network element selection apparatus is an access and mobility management function network element AMF in the 5G system. The processing unit is configured to: if the terminal device supports the first communications system and the second communications system, and the third subscription information indicates that a data network identity DNN of the session does not support interworking with the 4G system, skip selecting a co-located session management function network element as the target session management network element. For example, the skipping selecting a co-located session management function network element as the target session management network element includes selecting a session management function network element in the 5G system as the target session management network element.

In a possible implementation, the first communications system is a 4G system, the second communications system is a 5G system, and the network element selection apparatus is a mobility management function network element MME in the 4G system. The processing unit is configured to: if the terminal device supports the first communications system and the second communications system, and the third subscription information of the terminal indicates that a data network identity APN corresponding to the session supports interworking with the 5G system, select a co-located session management function network element as the target session management network element.

In a possible implementation, the first communications system is a 4G system, the second communications system is a 5G system, and the network element selection apparatus is a mobility management function network element MME in the 4G system. The processing unit is configured to: if the terminal device supports the first communications system and the second communications system, and the third subscription information indicates that a data network identity APN of the session does not support interworking with the 5G system, skip selecting a co-located session management function network element as the target session management network element. For example, the skipping selecting a co-located session management function network element as the target session management network element includes selecting a session management function network element in the 4G system as the target session management network element.

In a possible implementation, the apparatus further includes a sending unit configured to send a second message to the target session management function network element, such that the target session management function network element determines a policy control network element and a charging system based on the second message.

According to a fifth aspect, an embodiment of this application provides a network element selection apparatus, and the apparatus may be a first network element in a first communications system, or may be a chip in a first network element in a first communications system. The apparatus may include a processing unit and a transceiver unit. When the apparatus is the first network element in the first communications system, the processing unit may be a processor, and the transceiver unit may be a transceiver. The first network element in the first communications system may further include a storage unit, and the storage unit may be a memory. The storage unit is configured to store an instruction, and the processing unit executes the instruction stored in the storage unit, such that the first network element in the first communications system performs the method in any one of the first aspect or the possible designs of the first aspect. When the apparatus is the chip in the first network element in the first communications system, the processing unit may be a processor, and the transceiver unit may be an input/output interface, a pin, a circuit, or the like. The processing unit executes an instruction stored in the storage unit, and the storage unit is configured to store the instruction. The storage unit may be a storage unit (for example, a register or a cache) in the chip, or may be a storage unit (for example, a read-only memory or a random access memory) that is located out of the chip and that is in the first network element in the first communications system, such that the first network element in the first communications system performs the method in any one of the first aspect or the possible designs of the first aspect.

According to a sixth aspect, an embodiment of this application further provides a computer readable storage medium, and the computer readable storage medium stores a computer program. When the computer program runs on a computer, the computer is enabled to perform the method in the first aspect or the second aspect.

According to a seventh aspect, an embodiment of this application further provides a computer program product including a program. When the computer program product runs on a computer, the computer is enabled to perform the method in the first aspect or the second aspect.

BRIEF DESCRIPTION OF DRAWINGS

FIG. 2 is an overview flowchart of a network element selection method according to an embodiment of this application;

FIG. 3 is a schematic flowchart 1 of establishing a session connection by UE in a 4G network according to an embodiment of this application;

DESCRIPTION OF EMBODIMENTS

The following describes the embodiments of this application with reference to accompanying drawings.

Figure 1:
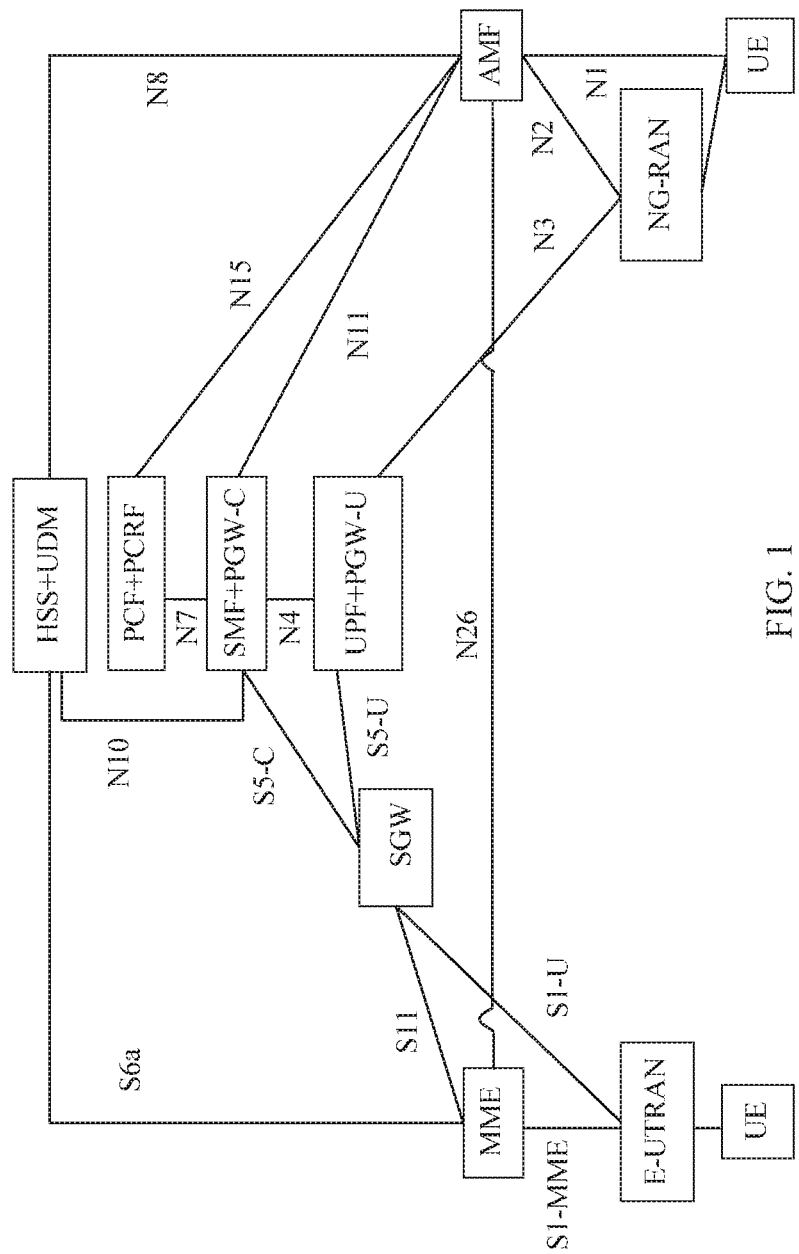
FIG. 1 is a schematic diagram of an interworking architecture of a 4G system and a 5G system according to an embodiment of this application.

FIG. 1 is a schematic diagram of an application scenario according to an embodiment of this application. It should be understood that FIG. 1 is only an example and is not used to limit this application.

In an interworking architecture of a 4G system and a 5G system shown in FIG. 1, a 4G network and a 5G network share a user plane function (UPF)+packet data network (PDN) gateway user plane function (PGW-U), a session management function (SMF)+protocol data unit (PDU) gateway control plane function (PGW-C), a policy control function (PCF)+policy and charging rules function (PCRF), and a home subscriber server (HSS)+unified data management UDM). As used herein, "+" represents co-location, and the "co-location" means that one device has functions of two entities. The UPF is a user plane function network element in 5G, the PGW-U is a PDU gateway user plane function network element that is in 4G and that corresponds to the UPF, and the UPF+PGW-U is a co-located user plane function network element, and has a user plane function of the 5G system and a user plane function of the 4G system. The SMF is a session management function network element in 5G, the PGW-C is a PDU gateway control plane function network element that is in 4G and that corresponds to the SMF, and the SMF+PGW-C is a co-located session management function network element, and has a session management capability of the 5G system and a session management capability of the 4G system. The PCF is a policy and charging rules function network element in 5G, the PCRF is a policy control function network element in 4G, an online charging system (OCS) and an offline charging system (OFCS) are charging system network elements in 4G, and the PCF+PCRF is a co-located policy and charging rules function network element, and has a policy and charging rules function of the 5G system and a policy and charging rules function of the 4G system. The UDM is configured to manage user data in 5G, for example, the user data in 5G includes subscription information of a user in 5G. The HSS corresponds to the UDM, and is configured to manage user data in 4G, for example, the user data in 4G includes subscription information of a user in 4G. The HSS+UDM is a co-located user data management network element. It should be noted that a next generation (NG) radio access network (NG-RAN) in FIG. 1 is an access network device in 5G, and an evolved Universal Mobile Telecommunications Service (UMTS) terrestrial radio access network (E-UTRAN) is an access network device in 4G. In the interworking architecture, an MME communicates with the E-UTRAN using a serving gateway (SGW) and the UPF+PGW-U or using a serving gateway and the SMF+PGW-C. In addition, the interworking architecture may further include a pure 4G network element, for example, may include at least one of the PGW-U, the PGW-C, the PCRF, or the HSS. Likewise, the interworking architecture may further include a pure 5G network element, for example, may include at least one of the UPF, the SMF, the PCF, or the UDM.

It should be understood that when a UE in the 5G system performs access, if an access and mobility management function (AMF) determines that the UE can support the 4G system and the 5G system, the AMF selects a co-located session management function network element for the UE to establish a connection. In some scenarios, the UE does not need to use a service of the 4G network or does not subscribe to a service of the 4G network. That is, UE supporting the 4G system and the 5G system may have no interworking requirement. Therefore, in this case, the AMF does not need to select a co-located session management function network element for the UE. Therefore, when the UE in the 5G system performs access, a problem that a network element is improperly selected also exists. Therefore, to resolve the problem that a network element is improperly selected, an embodiment of this application provides a network element selection method. As shown in FIG. 2, to enable UE that supports a 4G system and a 5G system and that has no interworking requirement to properly select a network element, the method includes the following steps.

Step 200: A first network element in a first communications system receives a first message from a terminal device, where the first message is used to request to establish a session. The first message is used to request to establish a session. In a possible design, the first network element determines, based on a message type or a message name of the first message, that the message is used to request to establish a session. For example, the first message is a PDU session establishment request, or the first message is a PDU connectivity request, and the first network element may determine, based on the message name, that the message is used to request to establish a session. Alternatively, the first message is an attach request, and the first network element may determine, based on the message type, that after successfully registering on a network side, the UE needs to request to establish a session.

Step 210: In response to the first message, the first network element in the first communications system determines a target session management function network element based on first subscription information and second subscription information, where the first subscription information includes subscription information of the terminal device in the first communications system, and the second subscription information includes subscription information of the terminal device in a second communications system. In a possible design, the first subscription information may be subscription information corresponding to one or more data network identities of the terminal device in the first communications system. The second subscription information may also be subscription information corresponding to one or more data network identities of the terminal device in the second communications system. In another possible design, the first subscription information may be indication information that indicates whether the terminal device subscribes to a data network identity in the first communications system, and the second subscription information may also be indication information that indicates whether the terminal device subscribes to a data network identity in the second communications system.

The first network element in the first communications system needs to obtain the first subscription information and the second subscription information. In a possible design, before step 200, the first network element in the first communications system sends a third message to a co-located user data management network element, and the third message is used to obtain the first subscription information and the second subscription information. The first network element in the first communications system stores the first subscription information and the second subscription information. Alternatively, the first network element in the first communications system separately queries a user data management network element in the first communications system for the first subscription information, and queries a user data management network element in the second communications system for the second subscription information. Therefore, the first network element in the first communications system may pre-store the first subscription information and the second subscription information. In another possible design, after step 200, before step 210, the first network element in the first communications system sends a fourth message to a co-located user data management network element, and the fourth message is used to query the first subscription information and the second subscription information. Alternatively, the first network element in the first communications system separately queries a user data management network element in the first communications system for the first subscription information, and queries a user data management network element in the second communications system for the second subscription information. Therefore, the first network element in the first communications system may query the first subscription information and the second subscription information in real time. It should be understood that the co-located user data management network element may be the HSS+UDM shown in FIG. 1. In addition, before obtaining the first subscription information and the second subscription information, the first network element in the first communications system may further determine a data network identity of a current session, then obtain, as the first subscription information, subscription information corresponding to the data network identity of the terminal device in the first communications system, and obtain, as the second subscription information, subscription information corresponding to a data network identity that corresponds to the data network identity and that is of the terminal device in the second communications system.

It should be understood that an order in which the first network element in the first communications system obtains the first subscription information and the second subscription information is not limited in this application. In other words, the first network element may simultaneously obtain the first subscription information and the second subscription information, or may first obtain the first subscription information and then obtain the second subscription information. In a possible design, the first network element in the first communications system first obtains the first subscription information. If it is determined that the first subscription information exists, the first network element then obtains the second subscription information. Alternatively, if it is determined that the first subscription information does not exist, the first network element rejects a current session establishment request, and optionally, no longer obtains the second subscription information.

In a possible implementation of step 210, the first network element in the first communications system may determine the target session management function network element based on a capability of the terminal device, the first subscription information, and the second subscription information. Optionally, before step 200, the first network element in the first communications system receives a non-access stratum (NAS) message from the terminal device, and the NAS message carries capability information of the terminal device. Alternatively, the first message carries capability information of the terminal device. For example, the capability information of the terminal device includes information about whether the terminal device supports the first communications system and information about whether the terminal device supports the second communications system. Alternatively, the capability information of the terminal device includes indication information indicating whether the terminal device supports the first communications system and the second communications system. Therefore, the first network element in the first communications system may determine, based on the capability information of the terminal device, whether the terminal device supports the first communications system and the second communications system.

A process in which the first network element in the first communications system determines the target session management function network element based on the capability of the terminal device, the first subscription information, and the second subscription information is described below with reference to specific application scenarios.

Scenario 1: The first communications system is a 4G system, the second communications system is a 5G system, and the first network element in the first communications system is an MME.

The scenario 1 may include two possible cases.

In a first possible case, if the terminal device supports the first communications system and the second communications system, and both the first subscription information and the second subscription information include subscription information corresponding to a data network identity of the session, the MME selects a co-located session management function network element as the target session management network element, for example, the SMF+PGW-C shown in FIG. 1.

In a second possible case, if the terminal device supports the first communications system and the second communications system, the first subscription information includes subscription information corresponding to a data network identity of the session, and the second subscription information does not include the subscription information corresponding to the data network identity of the session, the MME selects a session management function network element in the 4G system as the target session management network element, for example, the PGW-C shown in FIG. 1.

In the foregoing two possible cases, the MME needs to determine the target session management network element using two determining steps. An order of performing the two determining steps is not limited in this application.

One determining step is determining whether the terminal device supports the first communications system and the second communications system. For example, the MME may determine, based on the capability information of the terminal device, that the terminal device supports the first communications system and the second communications system.

The other determining step is determining whether both the first subscription information and the second subscription information include the subscription information corresponding to the data network identity of the session.

First, the MME needs to determine the data network identity of the session. When the first communications system is the 4G system and the second communications system is the 5G system, the data network identity of the session is an access point name (APN). A specific APN determining manner is not limited in this application. In a possible design, the first message carries the data network identity of the session, and the MME may determine the data network identity of the session based on the first message. In another possible design, the first message does not carry the data network identity, and the MME may determine an APN, for example, a default APN, or determine a configured APN for the session based on a local policy, a local configuration, or the like. The following method of determining the data network identity of the session by the MME is consistent with the method herein. Repeated content is not described again.

In a first implementation, the MME determines or obtains the first subscription information and the second subscription information based on the determined APN. In this case, the first subscription information is subscription information of the APN of the terminal device in the 4G system, or may be indication information that indicates whether the terminal device subscribes to the APN. The second subscription information is subscription information of a data network name (DNN) that corresponds to the APN and that is of the terminal device in the 5G system, or may be indication information that indicates whether the terminal device subscribes to the DNN, and the APN corresponds to the DNN. Alternatively, the second subscription information is subscription information of a DNN+single network slice selection assistance information (S-NSSAI) that corresponds to the APN and that is of the terminal device in the 5G system, or may be indication information that indicates whether the terminal device subscribes to the DNN+S-NSSAI, and the APN corresponds to the DNN+S-NSSAI. For example, for the first possibility, a manner in which the MME determines that both the first subscription information and the second subscription information include the subscription information corresponding to the data network identity of the session is as follows. The terminal device has the subscription information of the APN in the 4G system, and the terminal device has the subscription information of the DNN that corresponds to the APN and that is in the 5G system; or the terminal device has the subscription information of the APN in the 4G system, and the terminal device has the subscription information of the DNN+S-NSSAI that corresponds to the APN and that is in the 5G system.

For the second possibility, a manner in which the MME determines that the first subscription information includes the subscription information corresponding to the data network identity of the session, and that the second subscription information does not include the subscription information corresponding to the data network identity of the session is as follows. The terminal device has the subscription information of the APN in the 4G system, and the terminal device has no subscription information of the DNN that corresponds to the APN and that is in the 5G system. Alternatively, the terminal device has the subscription information of the APN in the 4G system, and the terminal device has no subscription information of the DNN+S-NSSAI that corresponds to the APN and that is in the 5G system. It should be noted that the subscription information of the DNN+S-NSSAI in this application is subscription information having a granularity of a DNN plus S-NSSAI. Subscription information of a DNN+S-NSSAI below has a same meaning as the subscription information of the DNN+S-NSSAI herein. Repeated content is not described again.

In a second possible implementation, the MME first obtains all subscription information of the terminal device in the 4G system and all subscription information of the terminal device in the 5G system. In this case, the first subscription information includes subscription information corresponding to each APN to which the terminal device subscribes in the 4G system, and the second subscription information includes subscription information corresponding to each DNN to which the terminal device subscribes in the 5G system, or the second subscription information includes subscription information corresponding to each DNN+S-NSSAI to which the terminal device subscribes in the 5G system. For the first possibility, a manner in which the MME determines that both the first subscription information and the second subscription information include the subscription information corresponding to the data network identity of the session is as follows. The MME determines that the first subscription information includes subscription information corresponding to the APN, and the second subscription information includes subscription information of a DNN corresponding to the APN. Alternatively, the first subscription information includes subscription information corresponding to the APN, and the second subscription information includes subscription information of a DNN+S-NSSAI corresponding to the APN.

For the second possibility, a manner in which the MME determines that the first subscription information includes the subscription information corresponding to the data network identity of the session, and that the second subscription information does not include the subscription information corresponding to the data network identity of the session is as follows. The MME determines that the first subscription information includes subscription information corresponding to the APN, and that the second subscription information does not include subscription information of a DNN corresponding to the APN. Alternatively, the MME determines that the first subscription information includes subscription information corresponding to the APN, and that the second subscription information does not include subscription information of a DNN+S-NSSAI corresponding to the APN.

In a third possible implementation, the MME first obtains all subscription information of the terminal device in the 4G system, and the first subscription information includes subscription information corresponding to each APN to which the terminal device subscribes in the 4G system. Then the MME determines or obtains the second subscription information based on the determined APN, and the second subscription information is subscription information of a DNN that corresponds to the APN and that is of the terminal device in the 5G system, or may be indication information that indicates whether the terminal device subscribes to the DNN. Alternatively, the second subscription information is subscription information of a DNN+S-NSSAI that corresponds to the APN and that is of the terminal device in the 5G system, or may be indication information that indicates whether the terminal device subscribes to the DNN+S-NSSAI. For the first possibility, a manner in which the MME determines that both the first subscription information and the second subscription information include the subscription information corresponding to the data network identity of the session is as follows. The first subscription information includes subscription information corresponding to the APN, and the terminal device has the subscription information of the DNN that corresponds to the APN and that is in the 5G system. Alternatively, the first subscription information includes subscription information corresponding to the APN, and the terminal device has the subscription information of the DNN+S-NSSAI that corresponds to the APN and that is in the 5G system. For the second possibility, a manner in which the MME determines that the first subscription information includes the subscription information corresponding to the data network identity of the session, and that the second subscription information does not include the subscription information corresponding to the data network identity of the session is as follows. The first subscription information includes subscription information corresponding to the APN, and the terminal device has no subscription information of the DNN that corresponds to the APN and that is in the 5G system. Alternatively, the first subscription information includes subscription information corresponding to the APN, and the terminal device has no subscription information of the DNN+S-NSSAI that corresponds to the APN and that is in the 5G system.

It should be understood that subscription information corresponding to all APNs included in the first subscription information is not in a one-to-one correspondence with subscription information of DNNs in the second subscription information, and subscription information of only some APNs is in a one-to-one correspondence with subscription information of DNNs in the 5G system. Likewise, subscription information corresponding to all APNs included in the first subscription information is not in a one-to-one correspondence with subscription information of DNNs+S-NSSAI in the second subscription information, and subscription information of only some APNs is in a one-to-one correspondence with subscription information of DNNs+S-NSSAI in the 5G system.

In a fourth possible implementation, if the terminal device supports the first communications system and the second communications system, after the MME determines the APN, the MME sends a fifth message to a co-located user data management network element, and the fifth message is used to query whether subscription information corresponding to a DNN corresponding to the APN exists in subscription information corresponding to the APN. The MME receives a query result from the co-located user data management network element. If the query result indicates that the subscription information corresponding to the DNN corresponding to the APN exists in the subscription information corresponding to the APN, the MME selects the co-located session management function network element. If the query result indicates that the subscription information corresponding to the DNN corresponding to the APN does not exist in the subscription information corresponding to the APN, the MME selects the session management function network element in the 4G system. Alternatively, if the terminal device supports the first communications system and the second communications system, after the MME determines the APN, the MME sends a fifth message to a co-located user data management network element, and the fifth message is used to query whether subscription information corresponding to a DNN+S-NSSAI corresponding to the APN exists in subscription information corresponding to the APN. The MME receives a query result from the co-located user data management network element. If the query result indicates that the subscription information corresponding to the DNN+S-NSSAI corresponding to the APN exists in the subscription information corresponding to the APN, the MME selects the co-located session management function network element. If the query result indicates that the subscription information corresponding to the DNN+S-NSSAI corresponding to the APN does not exist in the subscription information corresponding to the APN, the MME selects the session management function network element in the 4G system.

In a fifth possible implementation, the MME sends a sixth message to a co-located user data management network element, the sixth message is used to obtain a mapping relationship between an APN and a DNN, and the mapping relationship indicates that subscription information of the APN corresponds to subscription information of a DNN. The MME receives the mapping relationship from the co-located user data management network element, and stores the mapping relationship. For example, the MME may send the sixth message to the co-located user data management network element before receiving the first message from the terminal device, or the MME may send the sixth message to the co-located user data management network element after receiving the first message from the terminal device. After determining the APN, the MME queries the mapping relationship based on the APN. If the mapping relationship indicates that the APN corresponds to a DNN, the MME selects the co-located session management function network element. If the mapping relationship indicates that the APN corresponds to no DNN, the MME selects the session management function network element in the 4G system. Likewise, the foregoing design is also applicable to a case in which the APN corresponds to a DNN and S-NSSAI. Details are not described herein.

For example, the terminal device subscribes to three APNs in the 4G system, including an APN 1, an APN 2, and an APN 3, and subscribes to four DNNs in the 5G system, including a DNN 1, a DNN 2, a DNN 3, and a DNN 4. The APN 1 corresponds to the DNN 2, and the APN 3 corresponds to the DNN 3. In this way, the mapping relationship includes a mapping relationship between the APN 1 and the DNN 2 and a mapping relationship between the APN 3 and the DNN 3. If the MME determines the APN 2, the MME queries the mapping relationship based on the APN 2 and determines that the APN 2 corresponds to no DNN, and the MME selects the session management function network element in the 4G system. If the MME determines the APN 3, the MME queries the mapping relationship based on the APN 3 and determines that a DNN corresponding to the APN 4 is the DNN 3, and the MME selects the co-located session management function network element.

Therefore, in the foregoing possible implementations, the MME may select the co-located session management function network element as the target session management function network element for a terminal device having both an interworking capability and an interworking requirement. The MME may select the session management function network element in the 4G system as the target session management network element for a terminal device having an interworking capability but having no interworking requirement. That is, the terminal device does not need to use a service of a 5G network or does not subscribe to a service of a 5G network. In this way, a session requirement can be met, such that load of a co-located session management function network element can be reduced.

Scenario 2: The first communications system is a 5G system, the second communications system is a 4G system, and the first network element in the first communications system is an AMF.

The scenario 2 may include two possible cases.

In a first possible case, if the terminal device supports the first communications system and the second communications system, and both the first subscription information and the second subscription information include subscription information corresponding to a data network identity of the session, the AMF selects a co-located session management function network element as the target session management network element, for example, the SMF+PGW-C shown in FIG. 1.

In a second possible case, if the terminal device supports the first communications system and the second communications system, the first subscription information includes subscription information corresponding to a data network identity of the session, and the second subscription information does not include the subscription information corresponding to the data network identity of the session, the AMF selects a session management function network element in the 5G system as the target session management network element, and the session management function network element in the 5G system is an SMF.

Similar to the scenario 1, in the foregoing two possible cases, the AMF needs to determine the target session management network element using two determining steps. An order of performing the two determining steps is not limited.

One determining step is determining whether the terminal device supports the first communications system and the second communications system. For example, the AMF may determine, based on the capability information of the terminal device, that the terminal device supports the first communications system and the second communications system.

The other determining step is determining, by the AMF, whether both the first subscription information and the second subscription information include the subscription information corresponding to the data network identity of the session.

First, the AMF determines the data network identity of the current session. When the first communications system is the 5G system and the second communications system is the 4G system, the data network identity of the session is a DNN, or a DNN and S-NSSAI. A specific DNN determining manner or a specific manner of determining the DNN and S-NSSAI is not limited in this application. In a possible design, the first message carries the data network identity of the session, and the AMF may determine the data network identity of the session based on the first message. In another possible design, the first message does not carry the data network identity, and the AMF may determine a DNN, or a DNN and S-NSSAI, for example, a default DNN, or a default DNN and S-NSSAI, or determine a configured DNN or a configured DNN and S-NSSAI for the session based on a local policy, a local configuration, or the like. The following method of determining the data network identity of the session by the AMF is consistent with the method herein. Repeated content is not described again.

In a first implementation, the AMF determines or obtains the first subscription information and the second subscription information based on the determined DNN. In this case, the first subscription information is subscription information of the DNN of the terminal device in the 5G system, or may be indication information that indicates whether the terminal device subscribes to the DNN. The second subscription information is subscription information of an APN that corresponds to the DNN and that is of the terminal device in the 4G system, and the APN corresponds to the DNN. Alternatively, the second subscription information is subscription information of an APN that corresponds to the DNN and S-NSSAI and that is of the terminal device in the 4G system, and the APN corresponds to the DNN+S-NSSAI, or the second subscription information may be indication information that indicates whether the terminal device subscribes to the APN. For example, for the first possibility, a manner in which the AMF determines that both the first subscription information and the second subscription information include the subscription information corresponding to the data network identity of the session is as follows. The terminal device has the subscription information of the DNN in the 5G system, and the terminal device has the subscription information of the APN that corresponds to the DNN and that is in the 4G system. Alternatively, the terminal device has subscription information of the DNN+S-NSSAI in the 5G system, and the terminal device has the subscription information of the APN that corresponds to the DNN+S-NSSAI and that is in the 4G system. For the second possibility, a manner in which the AMF determines that the first subscription information includes the subscription information corresponding to the data network identity of the session, and that the second subscription information does not include the subscription information corresponding to the data network identity of the session is as follows. The terminal device has the subscription information of the DNN in the 5G system, and the terminal device has no subscription information of the APN that corresponds to the DNN and that is in the 4G system; or the terminal device has subscription information of the DNN+S-NSSAI in the 5G system, and the terminal device has no subscription information of the APN that corresponds to the DNN+S-NSSAI and that is in the 4G system.

In a second possible implementation, the AMF first obtains all subscription information of the terminal device in the 4G system and all subscription information of the terminal device in the 5G system. In this case, the first subscription information includes subscription information corresponding to each DNN to which the terminal device subscribes in the 5G system, or the first subscription information includes subscription information corresponding to each DNN+S-NSSAI to which the terminal device subscribes in the 5G system. The second subscription information includes subscription information of each APN to which the terminal device subscribes in the 4G system. For the first possibility, a manner in which the AMF determines that both the first subscription information and the second subscription information include the subscription information corresponding to the data network identity of the session is as follows. The AMF determines that the first subscription information includes subscription information corresponding to the DNN, and that the second subscription information includes subscription information of an APN corresponding to the DNN. Alternatively, the AMF determines that the first subscription information includes subscription information corresponding to the DNN+S-NSSAI, and that the second subscription information includes subscription information of an APN corresponding to the DNN+S-NSSAI. For the second possibility, a manner in which the AMF determines that the first subscription information includes the subscription information corresponding to the data network identity of the session, and that the second subscription information does not include the subscription information corresponding to the data network identity of the session is as follows. The AMF determines that the first subscription information includes subscription information corresponding to the DNN, and that the second subscription information does not include subscription information of an APN corresponding to the DNN. Alternatively, the AMF determines that the first subscription information includes subscription information corresponding to the DNN+S-NSSAI, and that the second subscription information does not include subscription information of an APN corresponding to the DNN+S-NSSAI.

In a third possible implementation, the AMF first obtains all subscription information of the terminal device in the 5G system, and the first subscription information includes subscription information of each DNN to which the terminal device subscribes in the 5G system, or the first subscription information includes subscription information corresponding to each DNN+S-NSSAI to which the terminal device subscribes in the 5G system. The AMF determines or obtains the second subscription information based on the determined DNN or the determined DNN+S-NSSA, and the second subscription information is subscription information of an APN that corresponds to the DNN or the DNN+S-NSSA and that is of the terminal device in the 4G system, or may be indication information that indicates whether the terminal device subscribes to the APN. For the first possibility, a manner in which the AMF determines that both the first subscription information and the second subscription information include the subscription information corresponding to the data network identity of the session is as follows. The first subscription information includes subscription information corresponding to the DNN, and the terminal device has subscription information of the APN that corresponds to the DNN and that is in the 4G system. Alternatively, the first subscription information includes subscription information corresponding to the DNN+S-NSSAI, and the terminal device has subscription information of the APN that corresponds to the DNN+S-NSSAI and that is in the 4G system. For the second possibility, a manner in which the AMF determines that the first subscription information includes the subscription information corresponding to the data network identity of the session, and that the second subscription information does not include the subscription information corresponding to the data network identity of the session is as follows. The first subscription information includes subscription information corresponding to the DNN, and the terminal device has no subscription information of the APN that corresponds to the DNN and that is in the 4G system. Alternatively, the first subscription information includes subscription information corresponding to the DNN+S-NSSAI, and the terminal device has no subscription information of the APN that corresponds to the DNN+S-NSSAI and that is in the 4G system.

It should be understood that subscription information corresponding to all DNNs included in the first subscription information is not in a one-to-one correspondence with subscription information of APNs in the second subscription information, and subscription information of only some DNNs is in a one-to-one correspondence with subscription information of APNs in the 4G system. Likewise, subscription information corresponding to all DNNs+S-NSSAI included in the first subscription information is not in a one-to-one correspondence with subscription information of APNs in the second subscription information, and subscription information of only some DNNs+S-NSSAI is in a one-to-one correspondence with subscription information of APNs in the 4G system.

In a fourth possible implementation, if the terminal device supports the first communications system and the second communications system, after the AMF determines the DNN, the AMF sends a seventh message to a co-located user data management network element, and the seventh message is used to query whether subscription information corresponding to an APN corresponding to the DNN exists in subscription information corresponding to the DNN. The AMF receives a query result from the co-located user data management network element. If the query result indicates that it is determined that the subscription information corresponding to the APN corresponding to the DNN exists, the AMF selects the co-located session management function network element. If the query result indicates that the subscription information corresponding to the APN corresponding to the DNN does not exist in the subscription information corresponding to the DNN, the AMF selects the session management function network element in the 5G system. Alternatively, if the terminal device supports the first communications system and the second communications system, after the AMF determines the DNN+S-NSSAI, the AMF sends a seventh message to a co-located user data management network element, and the seventh message is used to query whether subscription information of an APN corresponding to the DNN+S-NSSAI exists in subscription information corresponding to the DNN+S-NSSAI. The AMF receives a query result from the co-located user data management network element. If the query result indicates that it is determined that the subscription information corresponding to the APN corresponding to the DNN+S-NSSAI exists, the AMF selects the co-located session management function network element. If the query result indicates that the subscription information corresponding to the APN corresponding to the DNN+S-NSSAI does not exist in the subscription information corresponding to the DNN+S-NSSAI, the AMF selects the session management function network element in the 5G system.

In a fifth possible implementation, if the terminal device supports the first communications system and the second communications system, the AMF sends an eighth message to a co-located user data management network element. The eighth message is used to obtain a mapping relationship between a DNN and an APN, and the AMF receives the mapping relationship from the co-located user data management network element, and stores the mapping relationship. For example, the AMF may send the eighth message to the co-located user data management network element before receiving the first message from the terminal device. Alternatively, the AMF may send the eighth message to the co-located user data management network element after receiving the first message from the terminal device. After determining the DNN, the AMF queries the mapping relationship based on the DNN. If the mapping relationship indicates that the DNN corresponds to an APN, the AMF selects the co-located session management function network element. If the mapping relationship indicates that the DNN corresponds to no APN, the AMF selects the session management function network element in the 5G system. Likewise, the foregoing design is also applicable to a case in which the DNN+S-NSSAI corresponds to the APN. Details are not described herein.

For example, the terminal device subscribes to three APNs in the 4G system, including an APN 1, an APN 2, and an APN 3, and subscribes to four DNNs in the 5G system, including a DNN 1, a DNN 2, a DNN 3, and a DNN 4. The APN 1 corresponds to the DNN 2, and the APN 3 corresponds to the DNN 3. In this way, the mapping relationship includes a mapping relationship between the APN 1 and the DNN 2 and a mapping relationship between the APN 3 and the DNN 3. If the AMF determines the DNN 2, the AMF queries the mapping relationship based on the DNN 2 and determines that an APN corresponding to the DNN 2 is the APN 1, and the AMF selects the co-located session management function network element. If the AMF determines the DNN 1, the AMF queries the mapping relationship based on the DNN 1 and determines that the DNN 1 corresponds to no APN, and the AMF selects the session management function network element in the 5G system.

Therefore, in the foregoing possible implementations, the AMF may select the co-located session management function network element as the target session management function network element for a terminal device having both an interworking capability and an interworking requirement. The AMF may select the session management function network element in the 5G system as the target session management network element for a terminal device having an interworking capability but having no interworking requirement. That is, the terminal device does not need to use a service of a 4G network or does not subscribe to a service of a 4G network. In this way, a session requirement can be met, such that load of the co-located session management function network element can be reduced.

In addition, the first network element in the first communications system may further determine a second message based on the capability of the terminal device, the first subscription information, and the second subscription information, and send the second message to the target session management function network element, such that the target session management function network element determines a policy control network element and a charging system based on the second message. The second message includes instruction information instructing the target session management function network element to select a co-located policy control network element and a co-located charging system, or a policy control network element and a charging system that are in the first communications system.

The scenario 1 and the scenario 2 are separately described below.

Scenario 1: The first communications system is a 4G system, the second communications system is a 5G system, and the first network element in the first communications system is an MME.

If the terminal device supports the first communications system and the second communications system, the first subscription information includes the subscription information corresponding to the data network identity of the session, and the second subscription information does not include the subscription information corresponding to the data network identity of the session, the MME selects a co-located session management function network element, and the MME sends the second message to the co-located session management function network element, such that the co-located session management function network element determines, based on the second message, that a policy control network element and a charging system are a policy control network element and a charging system that are in the 4G system. The second message includes the instruction information instructing the co-located session management function network element to select the policy control network element and the charging system that are in the 4G system. Therefore, the MME may instruct, using the second message, the co-located session management function network element to select the policy control network element and the charging system that are in the 4G system for a terminal device that has an interworking capability but has no interworking requirement. In other words, the terminal device does not need to use a service of the 5G network or does not subscribe to a service of the 5G network, such that load of the co-located policy control network element and load of the co-located charging system can be reduced.

For example, in possible networking, all PGW-Cs are upgraded to SMFs+PGW-Cs, but a policy control network element and a charging system network element are not upgraded, in other words, a policy control network element in 4G may be a PCRF, and charging system network elements in 4G may be an OCS and an OFCS. In this case, even though the MME selects an SMF+PGW-C, the SMF+PGW-C is unaware that UE has no interworking requirement currently, in other words, the UE is not to access the 5G system. Therefore, the MME may send the second message to the SMF+PGW-C, and the second message includes instruction information instructing the SMF+PGW-C to select and access the policy control network element and the charging system that are in 4G.

It should be understood that, usually, when the MME selects the session management function network element in 4G, the session management function network element in 4G selects the policy control network element and the charging system that are in 4G. When the MME selects the co-located session management function network element, the co-located session management function network element selects the co-located policy control network element and the co-located charging system. However, according to the method provided in this embodiment of this application, the MME may instruct the co-located session management function network element to select the policy control network element and the charging system that are in the 4G system, such that load of the co-located policy control network element and load of the co-located charging system can be reduced.

Scenario 2: The first communications system is a 5G system, the second communications system is a 4G system, and the first network element in the first communications system is an AMF.

If the terminal device supports the first communications system and the second communications system, the first subscription information includes the subscription information corresponding to the data network identity of the session, and the second subscription information does not include the subscription information corresponding to the data network identity of the session, the AMF selects a co-located session management function network element, and the AMF sends the second message to the co-located session management function network element. Thus way, the co-located session management function network element determines, based on the second message, that a policy control network element and a charging system are a policy control network element and a charging system that are in 5G. The second message includes the instruction information instructing the co-located session management function network element to select the policy control network element and the charging system that are in the 5G system. Therefore, the AMF may instruct, using the second message, the co-located session management function network element to select the policy control network element and the charging system that are in the 5G system for a terminal device that has an interworking capability but has no interworking requirement. In other words, the terminal device does not need to use a service of the 4G network or does not subscribe to a service of the 4G network, such that load of the co-located policy control network element and load of the co-located charging system can be reduced.

For example, in possible networking, deployment of a pure SMF device has not started, in other words, all SMFs+PGW-Cs are obtained by upgrading PGW-Cs, but a policy control network element and a charging system-related network element are not upgraded. Therefore, the AMF can select only an SMF+PGW-C. The AMF sends the second message to the SMF+PGW-C, and the second message includes the instruction information instructing the SMF+PGW-C to select and access the policy control network element and the charging system that are in 5G, for example, a PCF.

It should be understood that, usually, when the AMF selects the session management function network element in 5G, the session management function network element in 5G selects the policy control network element and the charging system that are in 5G. When the AMF selects the co-located session management function network element, the co-located session management function network element selects the co-located policy control network element and the co-located charging system. However, according to the method provided in this embodiment of this application, the AMF may instruct the co-located session management function network element to select the policy control network element and the charging system that are in the 5G system, such that load of the co-located policy control network element and load of the co-located charging system can be reduced.

A network element selection process in this embodiment of this application is described below with reference to accompanying drawings.

FIG. 3 shows a process 1 in which UE establishes a session connection in a 4G network.

Step 301: An MME obtains UE capability information. In a possible design, in an attach procedure or track area update (TAU) procedure, the UE sends a NAS message to the MME. The NAS message carries the UE capability information (UE capabilities), and the UE capabilities include information about whether the UE supports a 4G system, information about whether the UE supports a 5G system, and the like, or the UE capabilities include indication information indicating whether the UE supports both a 4G system and a 5G system. The MME stores the UE capabilities.

Step 302: The UE sends a session request message to the MME, and the session request message may also be included in an attach request. The session request message may be a NAS message.

Step 303: The MME determines an APN. In a possible design, the session request message carries the APN. In another possible design, the session request message does not carry the APN, and the MME may determine an APN, for example, a default APN.

Step 304: The MME determines a target session management function network element based on the UE capability information, first subscription information, and second subscription information. If the terminal device supports the 4G system and the 5G system, and both the first subscription information and the second subscription information include subscription information corresponding to the APN, the MME performs step 305a. If the terminal device supports the 4G system and the 5G system, the first subscription information includes subscription information corresponding to the APN, and the second subscription information does not include the subscription information corresponding to the APN, the MME performs step 305b. It should be understood that, for a process in which the MME determines the target session management function network element based on the UE capability information, the first subscription information, and the second subscription information, reference may be made to the possible implementation in the scenario 1. Repeated content is not described again.

In a possible design, before step 302, for example, in the attach procedure or TAU procedure, the MME sends a third message to an HSS+UDM, and the third message is used to obtain the first subscription information and the second subscription information. The MME stores the first subscription information and the second subscription information. In another possible design, after step 303, the MME sends a fourth message to the HSS+UDM, and the fourth message is used to query the first subscription information and the second subscription information.

Step 305a: The MME selects an SMF+PGW-C as the target session management network element, and sends a session request message to the SMF+PGW-C.

Step 305b: The MME selects a PGW-C as the target session management network element, and sends a session request message to the PGW-C.

A subsequent session establishment procedure mainly includes configuration of radio resources, establishment of a user plane tunnel, and the like. For details, refer to other approaches.

Figure 4:
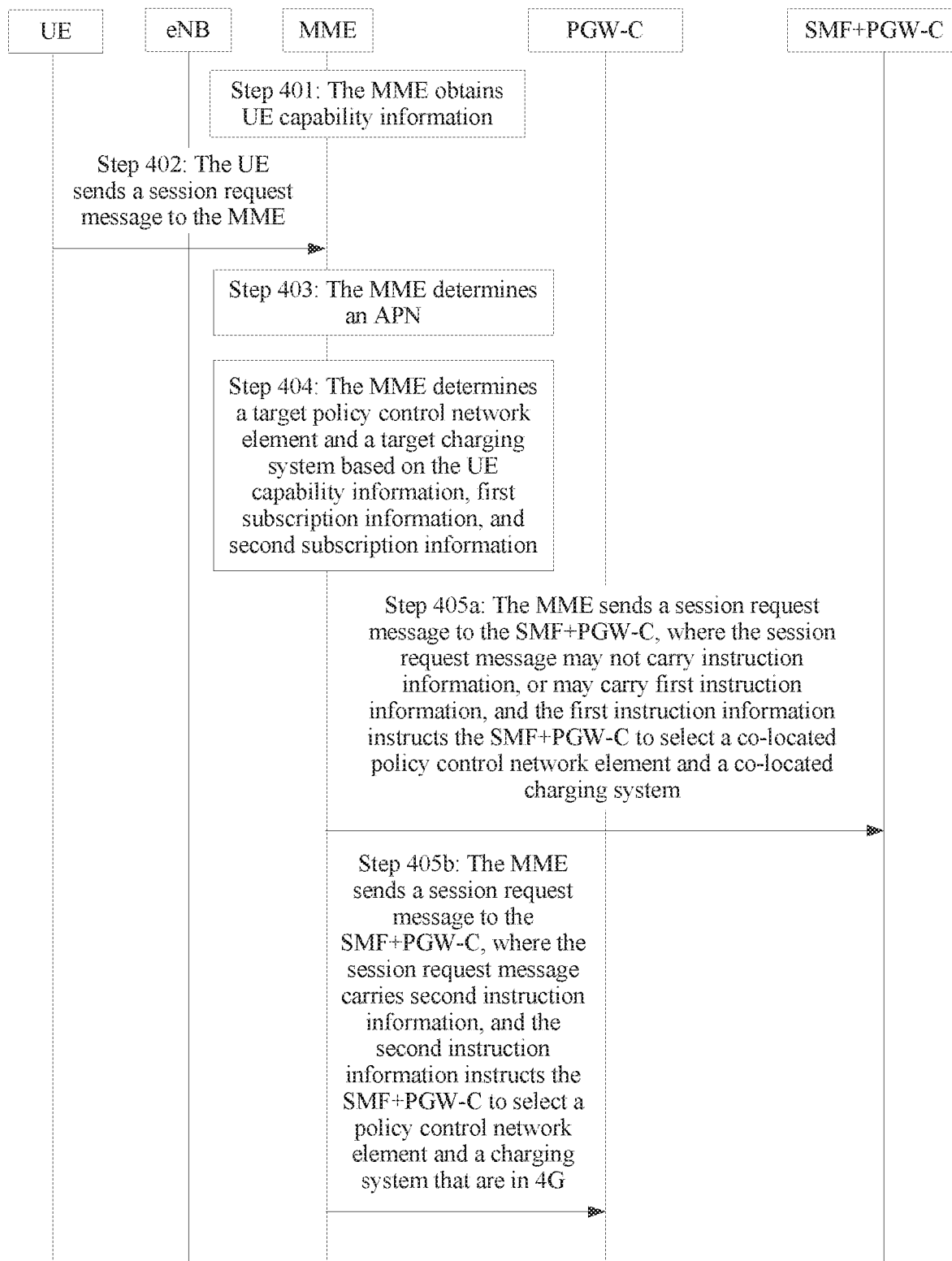
FIG. 4 is a schematic flowchart 2 of establishing a session connection by UE in a 4G network according to an embodiment of this application.

FIG. 4 shows a process 2 in which UE establishes a session connection in a 4G network. All PGW-Cs are upgraded to SMFs+PGW-Cs, but a policy control network element and a charging system-related network element are not upgraded. The policy control network element in 4G is a PCRF, charging system network elements in 4G are an OCS and an OFCS, and a policy control network element and a charging system that are in 5G are PCFs.

Step 401 to step 403 are the same as step 301 to step 303.

Step 404: The MME determines a target policy control network element and a target charging system based on the UE capability information, first subscription information, and second subscription information. If the terminal device supports a 4G system and a 5G system, and both the first subscription information and the second subscription information include subscription information corresponding to the APN, the MME performs step 405a. If the terminal device supports the 4G system and the 5G system, the first subscription information includes subscription information corresponding to the APN, and the second subscription information does not include the subscription information corresponding to the APN, the MME performs step 405b.

Step 405a: The MME sends a session request message to an SMF+PGW-C. The session request message may not carry instruction information, or may carry first instruction information. The first instruction information instructs the SMF+PGW-C to select a co-located policy control network element and a co-located charging system. Therefore, the target policy control network element and the target charging system are the co-located policy control network element and the co-located charging system.

Step 405b: The MME sends a session request message to the SMF+PGW-C, the session request message carries second instruction information, and the second instruction information instructs the SMF+PGW-C to select a policy control network element and a charging system that are in 4G. Therefore, the target policy control network element and the target charging system are the policy control network element and the charging system that are in 4G.

Figure 5:
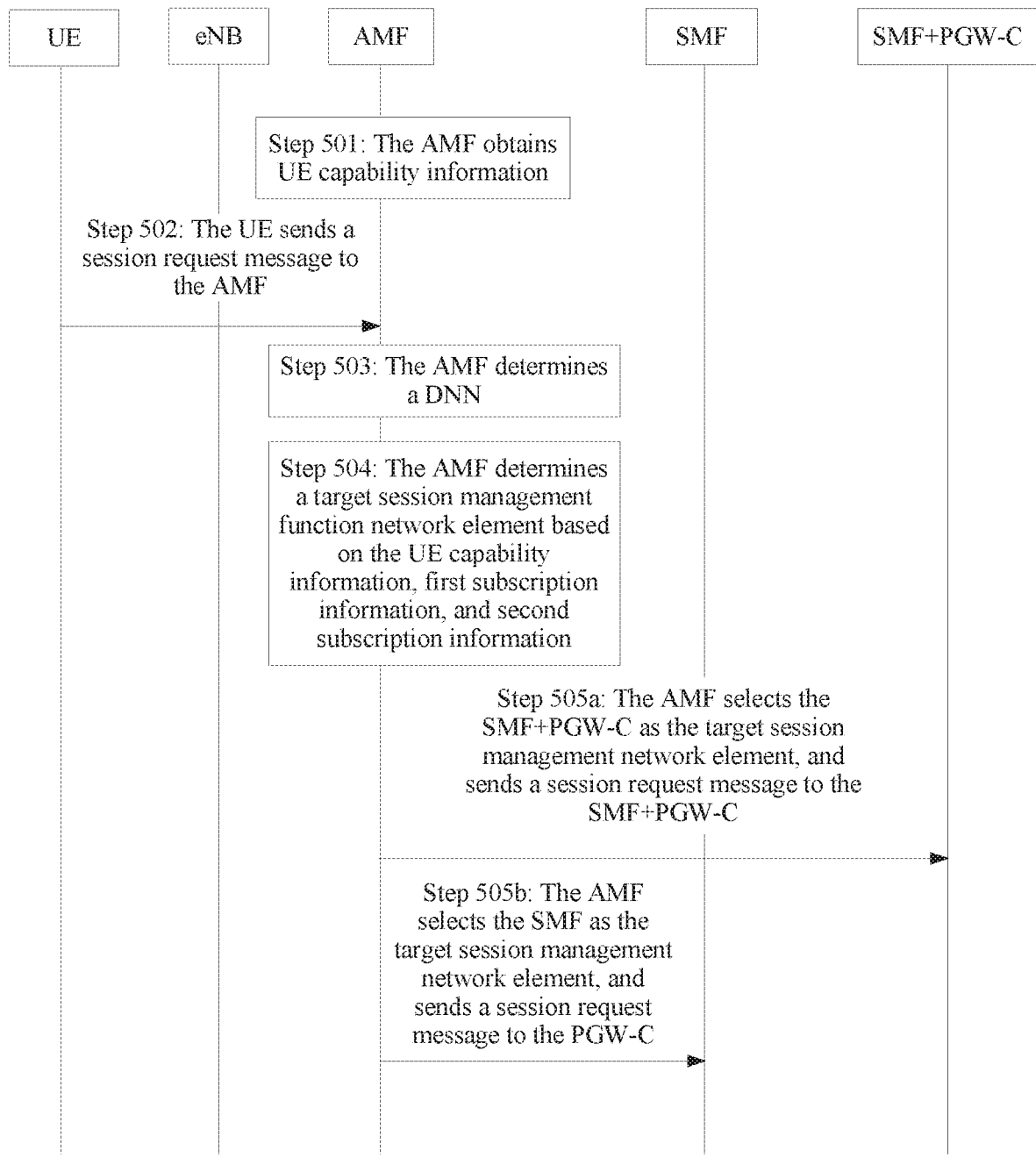
FIG. 5 is a schematic flowchart 1 of establishing a session connection by UE in a 5G network according to an embodiment of this application.

FIG. 5 shows a process 1 in which UE establishes a session connection in a 5G network. Only an example in which a DNN corresponds to an APN is used below for description. A processing procedure in which a DNN+S-NSSAI corresponds to an APN is similar. Details are not described herein again.

Step 501: An AMF obtains UE capability information. In a possible design, in a registration procedure or re-registration procedure, the UE sends a NAS message to the AMF. The NAS message carries the UE capability information (UE capabilities), and the UE capabilities include information about whether the UE supports a 4G system, information about whether the UE supports a 5G system, and the like, or the UE capabilities include indication information indicating whether the UE supports both a 4G system and a 5G system. The AMF stores the UE capabilities.

Step 502: The UE sends a session request message to the AMF, and the session request message is a NAS message.

Step 503: The AMF determines a DNN. In a possible design, the session request message carries the DNN. In another possible design, the session request message does not carry the DNN, and the AMF may determine a DNN, for example, a default DNN.

Step 504: The AMF determines a target session management function network element based on the UE capability information, first subscription information, and second subscription information. If the terminal device supports the 4G system and the 5G system, and both the first subscription information and the second subscription information include subscription information corresponding to the DNN, the AMF performs step 505*a*. If the terminal device supports the 4G system and the 5G system, the first subscription information includes subscription information corresponding to the DNN, and the second subscription information does not include the subscription information corresponding to the DNN, the AMF performs step 505*b*. It should be understood that, for a process in which the AMF determines the target session management function network element based on the UE capability information, the first subscription information, and the second subscription information, reference may be made to the possible implementation in the scenario 2. Repeated content is not described again.

In a possible design, before step 502, for example, in the registration procedure or re-registration procedure, the AMF sends a third message to an HSS+UDM, and the third message is used to obtain the first subscription information and the second subscription information. The AMF stores the first subscription information and the second subscription information. In another possible design, after step 503, the AMF sends a fourth message to the HSS+UDM, and the fourth message is used to query the first subscription information and the second subscription information.

Step 505*a*: The AMF selects an SMF+PGW-C as the target session management network element, and sends a session request message to the SMF+PGW-C.

Step 505*b*: The AMF selects an SMF as the target session management network element, and sends a session request message to the SMF.

A subsequent session establishment procedure mainly includes configuration of radio resources, establishment of a user plane tunnel, and the like. For details, refer to other approaches.

Figure 6:
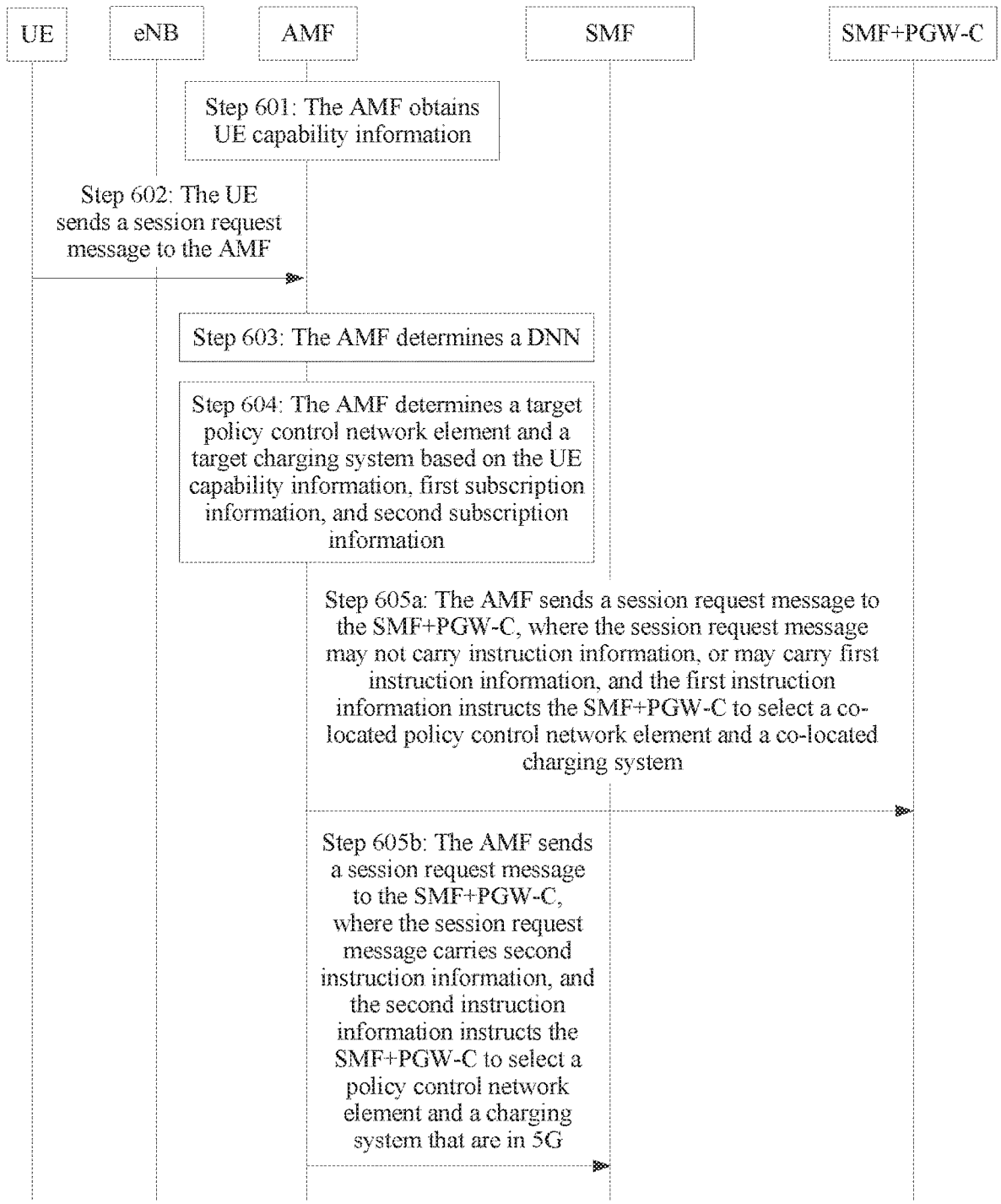
FIG. 6 is a schematic flowchart 2 of establishing a session connection by UE in a 5G network according to an embodiment of this application.

FIG. 6 shows a process 2 in which UE establishes a session connection in a 5G network. Deployment of a pure SMF device has not started, in other words, all SMFs+PGW-Cs are obtained by upgrading PGW-Cs, but a policy control network element and a charging system-related network element are not upgraded. For example, a policy control network element in 4G is a PCRF, and charging systems in 4G are an OCS and an OFCS. There is an independent policy control network element and an independent charging system in 5G, for example, a PCF.

Step 601 to step 603 are the same as step 501 to step 503.

Step 604: The AMF determines a target policy control network element and a target charging system based on the UE capability information, the first subscription information, and the second subscription information. If the terminal device supports a 4G system and a 5G system, and both the first subscription information and the second subscription information include subscription information corresponding to the DNN, the AMF performs step 605*a*. If the terminal device supports a 4G system and a 5G system, the first subscription information includes subscription information corresponding to the DNN, and the second subscription information does not include the subscription information corresponding to the DNN, the AMF performs step 605*b*.

Step 605*a*: The AMF sends a session request message to an SMF+PGW-C. The session request message may not carry instruction information, or may carry first instruction information. The first instruction information instructs the SMF+PGW-C to select a co-located policy control network element and a co-located charging system. Therefore, the target policy control network element and the target charging system are the co-located policy control network element and the co-located charging system.

Step 605*b*: The AMF sends a session request message to the SMF+PGW-C, the session request message carries second instruction information, and the second instruction information instructs the SMF+PGW-C to select and access a policy control network element and a charging system that are in 5G. Therefore, the target policy control network element and the target charging system are the policy control network element and the charging system that are in 5G.

Figure 7:
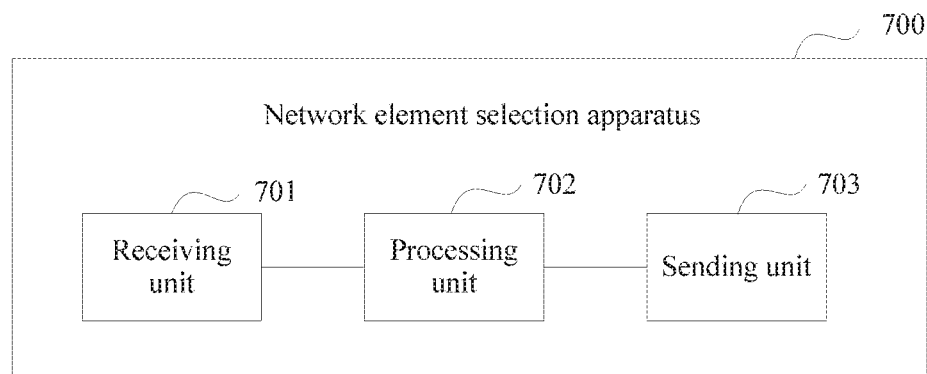
FIG. 7 is a schematic structural diagram of a network element selection apparatus according to an embodiment of this application.

Based on the foregoing embodiment, an embodiment of this application provides a network element selection apparatus. As shown in FIG. 7, the apparatus 700 includes: a receiving unit 701 configured to receive a first message from a terminal device, where the first message is used to request to establish a session; and a processing unit 702 configured such that in response to the first message, the processing unit 702 determines a target session management function network element based on first subscription information and second subscription information, where the first subscription information includes subscription information of the terminal device in the first communications system, and the second subscription information includes subscription information of the terminal device in a second communications system.

In a possible design, the processing unit 702 is configured to determine the target session management function network element based on a capability of the terminal device, the first subscription information, and the second subscription information.

In a possible design, the first communications system is a 4G system, the second communications system is a 5G system, and the apparatus is an MME. Additionally, the processing unit 702 is configured such that if the terminal device supports the first communications system and the second communications system, and both the first subscription information and the second subscription information include subscription information corresponding to a data network identity of the session, the processing unit 702 selects a co-located session management function network element as the target session management network element. Further, a network element having a session management capability of the 5G system and a session management capability of the 4G system is the co-located session management function network element.

In a possible design, the first communications system is a 4G system, the second communications system is a 5G system, and the apparatus is an MME. Additionally, the processing unit 702 is configured such that if the terminal device supports the first communications system and the second communications system, the first subscription information includes subscription information corresponding to a data network identity of the session, and the second subscription information does not include the subscription information corresponding to the data network identity of the session, the processing unit 702 selects a session management function network element in the 4G system as the target session management network element.

In a possible design, the first communications system is a 5G system, the second communications system is a 4G system, and the apparatus is an AMF. Additionally, the processing unit 702 is configured such that if the terminal device supports the first communications system and the second communications system, and both the first subscription information and the second subscription information include subscription information corresponding to a data network identity of the session, the processing unit 702 selects a co-located session management function network element as the target session management network element. Further, a network element having a session management capability of the 5G system and a session management capability of the 4G system is the co-located session management function network element.

In a possible design, the first communications system is a 5G system, the second communications system is a 4G system, and the apparatus is an AMF. Additionally, the processing unit 702 is configured such that if the terminal device supports the first communications system and the second communications system, the first subscription information includes subscription information corresponding to a data network identity of the session, and the second subscription information does not include the subscription information corresponding to the data network identity of the session, the processing unit 702 selects a session management function network element in the 5G system as the target session management network element.

In a possible design, the apparatus further includes a sending unit 703 configured to send a second message to the target session management function network element, such that the target session management function network element determines a policy control network element and a charging system based on the second message.

It can be understood that, for implementations of function modules included in the network element selection apparatus in FIG. 7 and corresponding benefits, reference may be made to the descriptions of the embodiment shown in FIG. 2. Details are not described herein.

It should be understood that division of the units is merely division of logical functions, and during actual implementation, all or some of the units may be integrated into one physical entity, or may be physically separated. In addition, these units may all be implemented using software through invoking by a processing element, or may all be implemented in a form of hardware. Alternatively, some units are implemented using software through invoking by a processing element, and some units are implemented in a form of hardware. During implementation, steps in the foregoing methods or the foregoing units can be implemented using a hardware integrated logic circuit in a processing element, or using instructions in a form of software.

For example, the foregoing units may be configured as one or more integrated circuits for implementing the foregoing methods, for example, one or more application-specific integrated circuits (ASIC), or one or more microprocessors (DSP), or one or more field programmable gate arrays (FPGA). For another example, when one of the foregoing units is implemented by invoking a program by a processing element, the processing element may be a general-purpose processor, such as a central processing unit (CPU) or another processor that can invoke the program. For another example, these units may be integrated together, and are implemented in a form of a system-on-a-chip (SOC).

In another optional variant, an embodiment of this application provides a network element selection apparatus. For example, the network element selection apparatus may be a chip, the apparatus includes a processor and an interface, and the interface may be an input/output interface. The processor implements the functions of the processing unit 702, and the interface implements the functions of the receiving unit 701 and the functions of the sending unit 703. The apparatus may further include a memory. The memory is configured to store a program that can run on the processor. When the processor executes the program, the method of the embodiment shown in FIG. 2 is performed.

Figure 8:
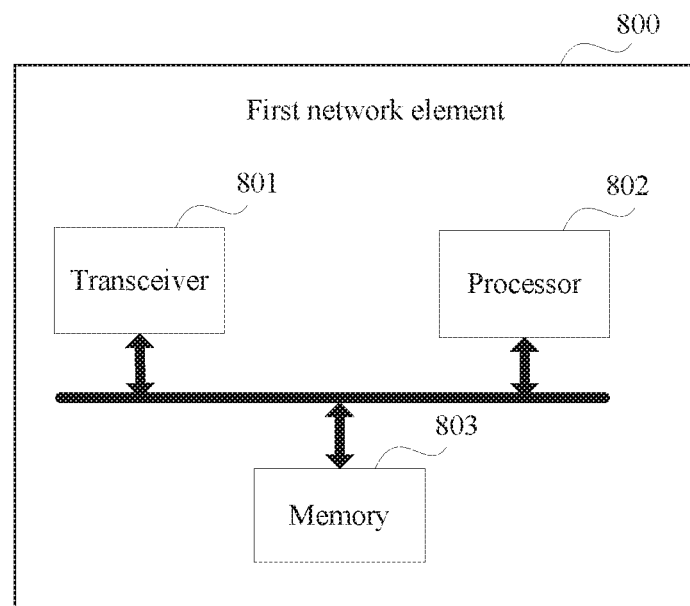
FIG. 8 is a schematic structural diagram of a first network element in a first communications system according to an embodiment of this application.

Based on the foregoing embodiment, an embodiment of this application further provides a first network element 800 in a first communications system. As shown in FIG. 8, the network element 800 includes a transceiver 801, a processor 802, and a memory 803. The memory 803 is configured to store a computer program. The processor 802 invokes the computer program stored in the memory 803, and performs, using the transceiver 801, the method shown in FIG. 2. The processor may be a CPU, a network processor (NP), a hardware chip, or any combination thereof. The memory may include a volatile memory, for example, a random access memory (RAM). Alternatively, the memory may include a non-volatile memory, such as a read-only memory (ROM), a flash memory, a hard disk drive (HDD), or a solid-state drive (SSD). Alternatively, the memory may include a combination of the foregoing types of memories.

It can be understood that the apparatus in the embodiment shown in FIG. 7 may be implemented using the network element 800 shown in FIG. 8. For example, the processing unit 702 may be implemented by the processor 802, and the receiving unit 701 and the sending unit 703 may be implemented by the transceiver 801. A structure of the network element 800 does not constitute a limitation on the embodiments of this application.

Figure 9:
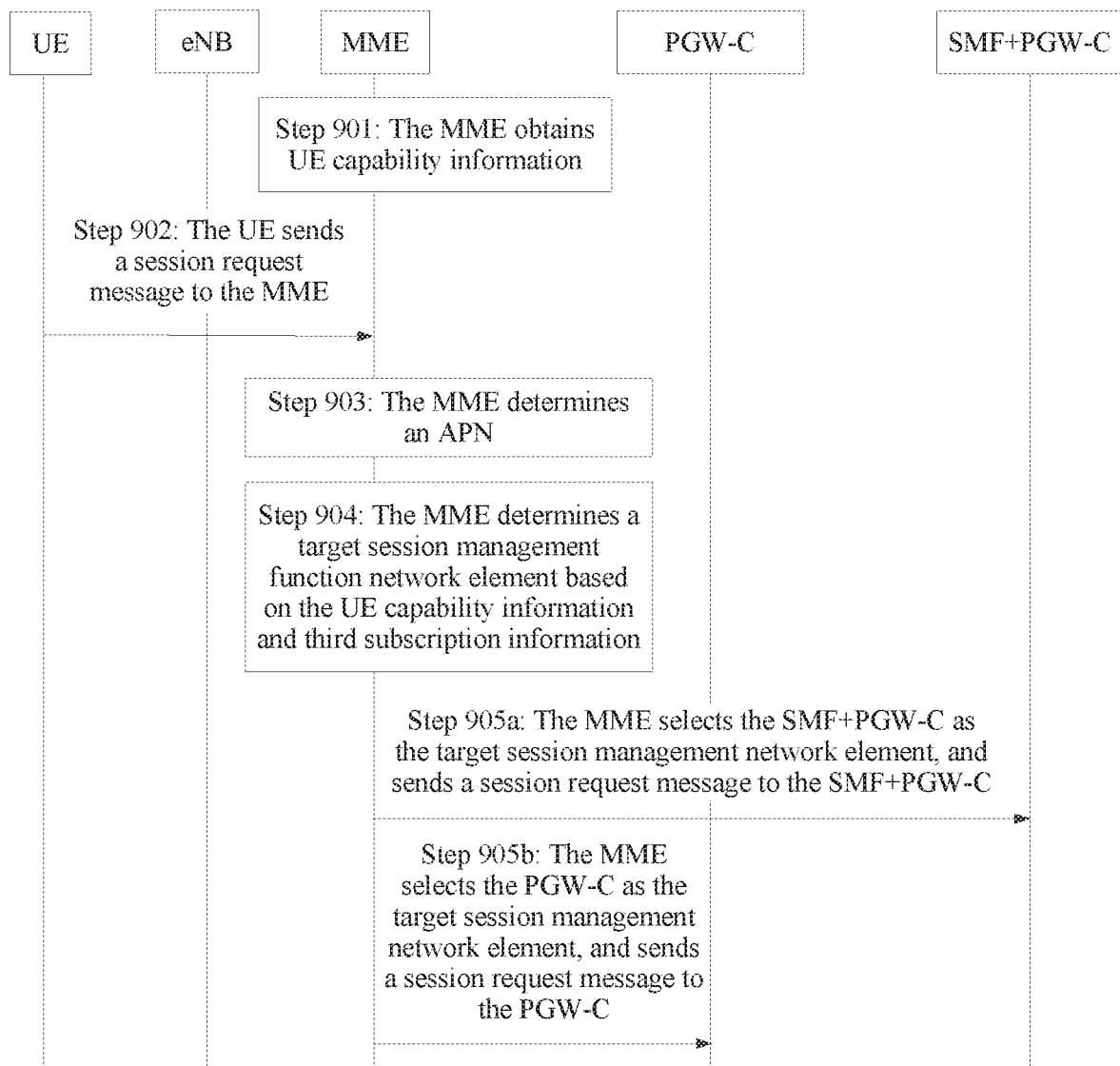
FIG. 9 is a schematic flowchart 3 of establishing a session connection by UE in a 4G network according to an embodiment of this application.

FIG. 9 shows a process 1 in which a UE establishes a session connection in a 4G network.

Step 901: An MME obtains UE capability information. In a possible design, in an attach procedure or track area update (TAU) procedure, the UE sends a NAS message to the MME. The NAS message carries the UE capability information, and the UE capabilities include information about whether the UE supports a 4G system, information about whether the UE supports a 5G system, and the like. Alternatively, the UE capabilities include indication information indicating whether the UE supports both a 4G system and a 5G system. The MME stores the UE capabilities.

Step 902: The UE sends a session request message to the MME, and the session request message may also be included in an attach request. The session request message may be a NAS message.

Step 903: The MME determines an APN. In a possible design, the session request message in step 902 carries the APN. In another possible design, the session request message does not carry the APN, and the MME may determine an APN, for example, a default APN. An APN determining manner is described above. Details are not described again.

Step 904: The MME determines a target session management function network element based on the UE capability information (or referred to as a capability of a terminal) and third subscription information. For example, if the capability of the terminal indicates that the UE supports the 4G system and the 5G system, and the third subscription of the terminal indicates that a data network identity APN corresponding to the session supports interworking with the 5G system (or referred to as a 5GC), the MME selects a co-located session management function network element as the target session management network element, and performs step 905*a*. Optionally, that the third subscription of the terminal indicates that a data network identity APN corresponding to the session supports interworking with the 5G system (or referred to as a 5GC) further includes: The third subscription information of the terminal is indication information indicating that the data network identity APN corresponding to the session supports interworking with a DNN and a network slice identification S-NSSAI. The co-located session management function network element may be a network element having both a session management capability of the 4G system and a session management capability of the 5G system, for example, an SMF+PGW-C. If the capability of the terminal indicates that the UE supports the 4G system and the 5G system, and the third subscription information indicates that a data network identity APN of the session does not support interworking with the 5G system, the MME does not select a co-located session management function network element as the target session management network element, and performs step 905*b*. That the MME does not select a co-located session management function network element as the target session management network element includes: selecting, by the MME as the target session management network element, a session management function network element that is not specially used for interworking, for example, a PGW-C or a PGW in a pure 4G system. Therefore, the MME may select the co-located session management function network element as the target session management function network element for a terminal device having both an interworking capability and an interworking requirement.

In addition, the MME may further determine a second message based on the capability of the terminal device and the third subscription information, and send the second message to the target session management function network element, such that the target session management function network element determines a policy control network element and a charging system based on the second message. The second message includes instruction information instructing the target session management function network element to select a co-located policy control network element and a co-located charging system, or a policy control network element and a charging system that are in the first communications system. For a process, refer to the embodiment corresponding to FIG. 4.

Step 905*a*: The MME selects an SMF+PGW-C as the target session management network element, and sends a session request message to the SMF+PGW-C.

Step 905*b*: The MME selects a PGW-C as the target session management network element, and sends a session request message to the PGW-C.

A subsequent session establishment procedure mainly includes configuration of radio resources, establishment of a user plane tunnel, and the like. For details, refer to other approaches.

Therefore, the MME may select a session management function network element in the 4G system as the target session management network element for a terminal device having an interworking capability but having no interworking requirement. That is, the terminal device does not support interworking with 5G. In this way, a session requirement can be met, such that load of the co-located session management function network element can be reduced. Optionally, the MME may instruct the co-located session management network element to select a policy control network element and a charging system that are in the 4G system for a terminal device having an interworking capability but having no interworking requirement. That is, the terminal device does not support interworking with 5G, such that load of the co-located policy control network element and load of the co-located charging system can be reduced.

Further, it can be understood that, for content that is not clearly described in the descriptions in the embodiment corresponding to FIG. 9, reference may be made to an explanation of the foregoing embodiments.

In addition, a logical structure of the MME in FIG. 9 may be shown in FIG. 7, and the steps described in FIG. 9 may be implemented using the processing unit, the receiving unit, and the sending unit that are in FIG. 7. It can be understood that the apparatus in the embodiment shown in FIG. 7 may be implemented using the network element 800 shown in FIG. 8. For example, the processing unit 702 may be implemented by the processor 802, and the receiving unit 701 and the sending unit 703 may be implemented by the transceiver 801. A structure of the network element 800 does not constitute a limitation on the embodiments of this application.

Figure 10:
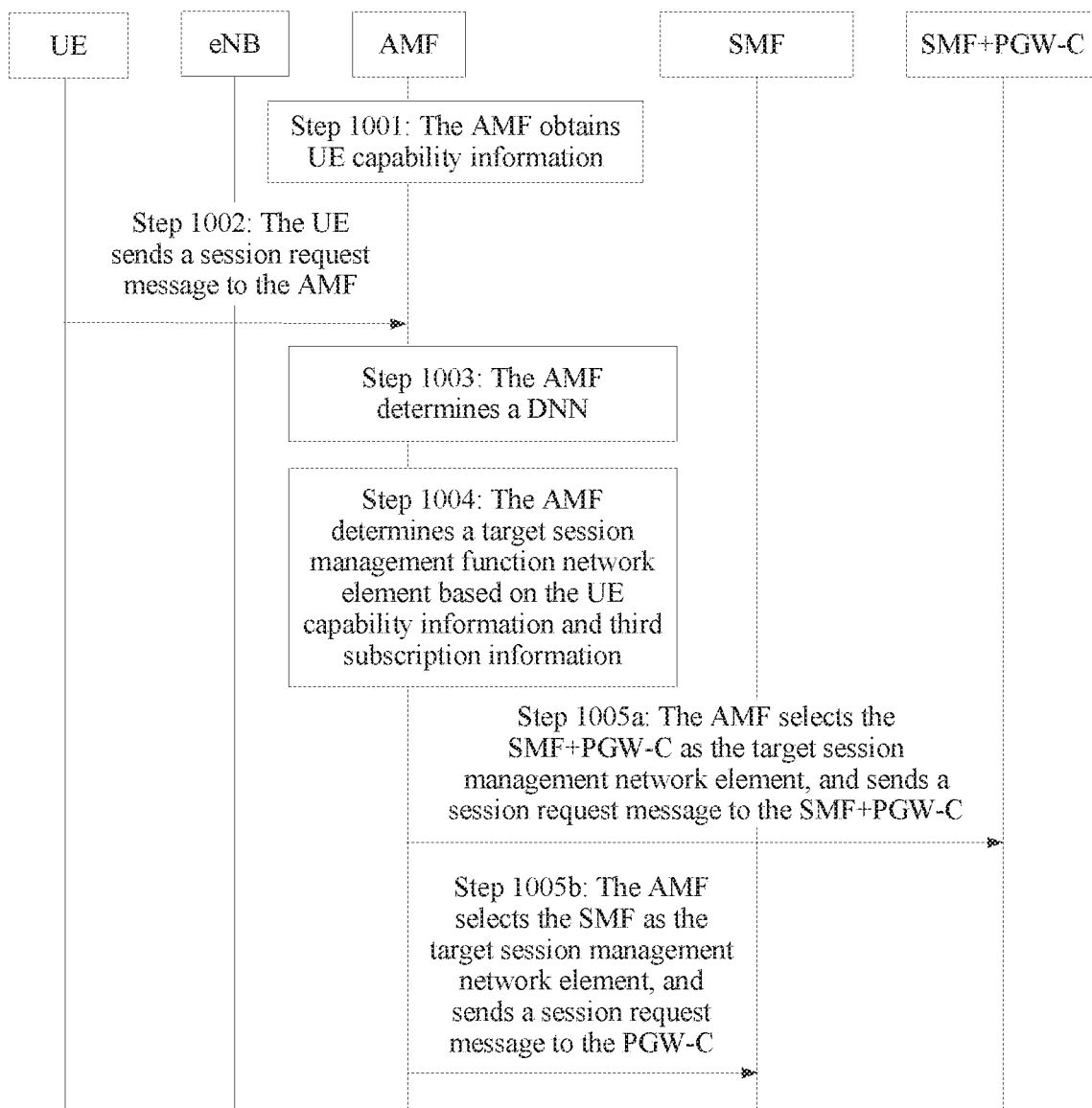
FIG. 10 is a schematic flowchart 3 of establishing a session connection by UE in a 5G network according to an embodiment of this application.

FIG. 10 shows a process 1 in which a UE establishes a session connection in a 5G network.

Step 1001: An AMF obtains UE capability information. In a possible design, in a registration procedure or re-registration procedure, the UE sends a NAS message to the AMF. The NAS message carries the UE capability information (UE capabilities), and the UE capabilities include information about whether the UE supports a 4G system, information about whether the UE supports a 5G system, and the like. Alternatively, the UE capabilities include indication information indicating whether the UE supports both a 4G system and a 5G system. The AMF stores the UE capabilities.

Step 1002: The UE sends a session request message to the AMF, and the session request message is a NAS message.

Step 1003: The AMF determines a DNN. In a possible design, the session request message in step 1002 carries the DNN. In another possible design, the session request message does not carry the DNN, and the AMF may determine an APN, for example, a default DNN. A DNN determining manner is described above. Details are not described again.

Step 1004: The AMF determines a target session management function network element based on the UE capability information (or referred to as a capability of a terminal) and third subscription information. For example, if the capability of the terminal indicates that the UE supports the 4G system and the 5G system, and the third subscription of the terminal indicates that a data network identity DNN corresponding to the session supports interworking with the 4G system (or referred to as an EPS or an Evolved Packet Core (EPC) system), the AMF selects a co-located session management function network element as the target session management network element, and performs step 1005*a*. Optionally, that the third subscription of the terminal indicates that a data network identity DNN corresponding to the session supports interworking with the 4G system (or referred to as an EPS or an EPC) further includes: The third subscription information of the terminal is indication information indicating that the data network identity DNN and a network slice identification S-NSSAI that correspond to the session support interworking. The co-located session management function network element may be a network element having both a session management capability of the 4G system and a session management capability of the 5G system, for example, an SMF+PGW-C. If the capability of the terminal indicates that the UE supports the 4G system and the 5G system, and the third subscription information indicates that a data network identity DNN of the session does not support interworking with the 4G system, the AMF does not select a co-located session management function network element as the target session management network element, and performs step 1005*b*. That the AMF does not select a co-located session management function network element as the target session management network element includes: selecting, by the AMF as the target session management network element, a session management function network element that is not specially used for interworking, for example, an SMF in a pure 5G system. Therefore, the AMF may select the co-located session management function network element as the target session management function network element for a terminal device having both an interworking capability and an interworking requirement.

In addition, the AMF may further determine a second message based on the capability of the terminal device and the third subscription information, and send the second message to the target session management function network element, such that the target session management function network element determines a policy control network element and a charging system based on the second message. The second message includes instruction information instructing the target session management function network element to select a co-located policy control network element and a co-located charging system, or a policy control network element and a charging system that are in the first communications system. For a process, refer to the embodiment corresponding to FIG. 6.

Step 1005*a*: The AMF selects an SMF+PGW-C as the target session management network element, and sends a session request message to the SMF+PGW-C.

Step 1005*b*: The AMF selects an SMF as the target session management network element, and sends a session request message to the SMF.

A subsequent session establishment procedure mainly includes configuration of radio resources, establishment of a user plane tunnel, and the like. For details, refer to other approaches.

Therefore, the AMF may select a session management function network element in the 5G system as the target session management network element for a terminal device having an interworking capability but having no interworking requirement. That is, the terminal device does not support interworking with 4G. In this way, a session requirement can be met, such that load of a co-located session management function network element can be reduced. Optionally, the AMF may instruct the co-located session management network element to select a policy control network element and a charging system that are in the 5G system for a terminal device having an interworking capability but having no interworking requirement. That is, the terminal device does not support interworking with 4G, such that load of the co-located policy control network element and load of the co-located charging system can be reduced.

Further, it can be understood that, for content that is not clearly described in the descriptions in the embodiment corresponding to FIG. 10, reference may be made to an explanation of the foregoing embodiments.

In addition, a logical structure of the AMF in FIG. 10 may be shown in FIG. 7, and the steps described in FIG. 10 may be implemented using the processing unit, the receiving unit, and the sending unit that are in FIG. 7. It can be understood that the apparatus in the embodiment shown in FIG. 7 may be implemented using the network element 800 shown in FIG. 8. For example, the processing unit 702 may be implemented by the processor 802, and the receiving unit 701 and the sending unit 703 may be implemented by the transceiver 801. A structure of the network element 800 does not constitute a limitation on the embodiments of this application.

An embodiment of this application further provides a computer readable storage medium. The computer readable storage medium stores a computer program. When the computer program runs on a computer, the computer is enabled to perform the method of the embodiment shown in FIG. 2, the processor is enabled to perform the steps corresponding to the MME shown in FIG. 9, and the processor is also enabled to perform the steps corresponding to the AMF shown in FIG. 10.

To sum up, in the method provided in this embodiment of this application, a first network element in a first communications system receives a first message from a terminal device, and the first message is used to request to establish a session. In response to the first message, the first network element in the first communications system determines a target session management function network element based on first subscription information and second subscription information. Compared with selecting a network element based only on whether the terminal device supports a 4G system and a 5G system in other approaches, a terminal device that supports the 4G system and the 5G system and that has no interworking requirement can properly select a network element, and load of a co-located session management function network element can be reduced.

When the first communications system is a 4G system, the second communications system is a 5G system, and the first network element in the first communications system is an MME, the MME may select a co-located session management function network element as the target session management function network element for a terminal device having both an interworking capability and an interworking requirement. The MME may select a session management function network element in the 4G system as the target session management network element for a terminal device having an interworking capability but having no interworking requirement. That is, the terminal device does not need to use a service of a 5G network or does not subscribe to a service of a 5G network. In this way, a session requirement can be met, such that load of a co-located session management function network element can be reduced.

When the first communications system is a 5G system, the second communications system is a 4G system, and the first network element in the first communications system is an AMF, the AMF may select a co-located session management function network element as the target session management function network element for a terminal device having both an interworking capability and an interworking requirement.

The AMF may select a session management function network element in the 5G system as the target session management network element for a terminal device having an interworking capability but having no interworking requirement. That is, the terminal device does not need to use a service of a 4G network or does not subscribe to a service of a 4G network. In this way, a session requirement can be met, such that load of a co-located session management function network element can be reduced.

When the first communications system is a 4G system, the second communications system is a 5G system, and the first network element in the first communications system is an MME, the MME may instruct, using a second message, a co-located session management function network element to select a policy control network element and a charging system that are in the 4G system for a terminal device having an interworking capability but having no interworking requirement. That is, the terminal device does not need to use a service of a 5G network or does not subscribe to a service of a 5G network, such that load of a co-located policy control network element and load of a co-located charging system can be reduced. When the first communications system is a 5G system, the second communications system is a 4G system, and the first network element in the first communications system is an AMF, the AMF may instruct, using a second message, a co-located session management function network element to select a policy control network element and a charging system that are in the 5G system for a terminal device having an interworking capability but having no interworking requirement. That is, the terminal device does not need to use a service of a 4G network or does not subscribe to a service of a 4G network, such that load of a co-located policy control network element and load of a co-located charging system can be reduced.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a magnetic disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by a computer or a processor of another programmable data processing device generate an apparatus for implementing a function in one or more processes in the flowcharts and/or in one or more blocks in the block diagrams.

These computer program instructions may be stored in a computer readable memory that can instruct the computer or another programmable data processing device to work in a specific manner, such that the instructions stored in the computer readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device, such that a series of operations and steps are performed on the computer or the other programmable device, thereby generating computer-implemented processing. Therefore, the instructions executed on the computer or the other programmable device provide steps for implementing a function in one or more processes in the flowcharts and/or in one or more blocks in the block diagrams.

A person skilled in the art can make various modifications and variations to embodiments of this application without departing from the spirit and scope of this application. In this way, this application is intended to cover these modifications and variations provided that they fall within the scope of protection defined by the following claims and their equivalent technologies.

What is claimed is:

1. A network element selection method, wherein the method comprises:
   receiving, by a first network element in a first communications system, a first message from a terminal device, wherein the first message requests establishing a session; and
   determining, by the first network element in response to the first message, a target session management function network element based on a capability of the terminal device and subscription information of the terminal device,
   wherein the first network element is an access and mobility management function (AMF) network element, wherein determining, by the first network element, the target session management function network element comprises selecting, by the AMF network element, a co-located session management function network element as the target session management network element if the terminal device supports the first communications system and a second communications system and if the subscription information of the terminal device indicates that a data network identity corresponding to the session supports interworking with a fourth generation (4G) system, wherein the first communications system is a fifth generation (5G) system, and wherein the second communications system is the 4G system.

2. The network element selection method according to claim 1, further comprising sending, by the first network element, a second message to the target session management function network element, such that the target session management function network element determines a policy control network element and a charging system based on the second message.

3. A network element selection method, wherein the method comprises:
   receiving, by a first network element in a first communications system, a first message from a terminal device, wherein the first message requests establishing a session; and
   determining, by the first network element in response to the first message, a target session management function network element based on a capability of the terminal device and subscription information of the terminal device, wherein the first network element is an access and mobility management function (AMF) network element, wherein determining, by the first network element, the target session management function network element comprises refraining, by the AMF network element, from selecting a co-located session management function network element as the target session management network element if the terminal device supports the first communications system and a second communications system and if the subscription information indicates that a data network identity of the session does not support interworking with a fourth generation (4G) system, wherein the first communications system is a fifth generation (5G) system, and wherein the second communications system is the 4G system.

4. The network element selection method according to claim 3, wherein refraining, by the AMF network element, from selecting the co-located session management function network element as the target session management network element comprises selecting, by the AMF network element, a session management function network element in the 5G system as the target session management network element.

5. A network element selection method, wherein the method comprises:
receiving, by a first network element in a first communications system, a first message from a terminal device, wherein the first message requests establishing a session; and
determining, by the first network element in response to the first message, a target session management function network element based on a capability of the terminal device and subscription information of the terminal device,
wherein the first network element is a mobility management entity (MIME), wherein determining, by the first network element, the target session management function network element comprises selecting, by the MIME, a co-located session management function network element as the target session management network element if the terminal device supports the first communications system and a second communications system and if the subscription information of the terminal device indicates that a data network identity corresponding to the session supports interworking with a fifth generation (5G) system, wherein the first communications system is a fourth generation (4G) system, and wherein the second communications system is the 5G system.

6. A network element selection method, wherein the method comprises:
receiving, by a first network element in a first communications system, a first message from a terminal device, wherein the first message requests establishing a session; and
determining, by the first network element in response to the first message, a target session management function network element based on a capability of the terminal device and subscription information of the terminal device,
wherein the first network element is a mobility management entity (MME), wherein determining, by the first network element, the target session management function network element comprises refraining, by the MME, from selecting a co-located session management function network element as the target session management network element if the terminal device supports the first communications system and a second communications system and if the subscription information indicates that a data network identity of the session does not support interworking with a fifth generation (5G) system, wherein the first communications system is a fourth generation (4G) system, and wherein the second communications system is the 5G system.

7. The network element selection method according to claim 6, wherein refraining, by the MME, from selecting the co-located session management function network element as the target session management network element comprises selecting, by the MME, a session management function network element in the 4G system as the target session management network element.

8. A network element selection apparatus, wherein the apparatus comprises:
a transceiver;
a memory storing instructions; and
a processor coupled to the transceiver and the memory, wherein the processor is configured to execute the instructions such that when executed, cause the processor to:
receive, through the transceiver, a first message from a terminal device, wherein the first message requests establishing a session;
in response to the first message, determine a target session management function network element based on a capability of the terminal device and subscription information of the terminal device; and
select a co-located session management function network element as the target session management network element if the terminal device supports a first communications system and a second communications system and if the subscription information of the terminal device indicates that a data network identity corresponding to the session supports interworking with a fourth generation (4G) system, wherein the first communications system is a fifth generation (5G) system, wherein the second communications system is the 4G system, and wherein the network element selection apparatus is an access and mobility management function (AMF) network element in the 5G system.

9. The network element selection apparatus according to claim 8, wherein the instructions, when executed, further cause the processor to send, through the transceiver, a second message to the target session management function network element, such that the target session management function network element determines a policy control network element and a charging system based on the second message.

10. A network element selection apparatus, wherein the apparatus comprises:
a transceiver;
a memory storing instructions; and
a processor coupled to the transceiver and the memory, wherein the processor is configured to execute the instructions such that when executed, cause the processor to:
receive, through the transceiver, a first message from a terminal device, wherein the first message requests establishing a session;
in response to the first message, determine a target session management function network element based on a capability of the terminal device and subscription information of the terminal device; and refrain from selecting a co-located session management function network element as the target session management network element if the terminal device supports a first communications system and a second communications system, and the subscription information indicates that a data network identity of the session does not support interworking with a fourth generation (4G) system, wherein the first communications system is a fifth generation (5G) system, wherein the second communications system is the 4G system, and wherein the network element selection apparatus is an access and mobility management function (AMF) network element in the 5G system.

11. The network element selection apparatus according to claim 10, wherein the instructions, when executed, further cause the processor to select a session management function network element in the 5G system as the target session management network element.

12. A network element selection apparatus, wherein the apparatus comprises:
a transceiver;
a memory storing instructions; and
a processor coupled to the transceiver and the memory, wherein the processor is configured to execute the instructions such that when executed, cause the processor to:
receive, through the transceiver, a first message from a terminal device, wherein the first message requests establishing a session;
in response to the first message, determine a target session management function network element based on a capability of the terminal device and subscription information of the terminal device; and
select a co-located session management function network element as the target session management network element if the terminal device supports a first communications system and a second communications system and if the subscription information of the terminal device indicates that a data network identity corresponding to the session supports interworking with a fifth generation (5G) system, wherein the first communications system is a fourth generation (4G) system, wherein the second communications system is the 5G system, and wherein the network element selection apparatus is a mobility management entity (MME) in the 4G system.

13. A network element selection apparatus, wherein the apparatus comprises:
a transceiver;
a memory storing instructions; and
a processor coupled to the transceiver and the memory, wherein the processor is configured to execute the instructions such that when executed, cause the processor to:
receive, through the transceiver, a first message from a terminal device, wherein the first message requests establishing a session;
in response to the first message, determine a target session management function network element based on a capability of the terminal device and subscription information of the terminal device;
refrain from selecting a co-located session management function network element as the target session management network element if the terminal device supports a first communications system and a second communications system and if the subscription information indicates that a data network identity of the session does not support interworking with a fifth generation (5G) system, wherein the first communications system is a fourth generation (4G) system, wherein the second communications system is the 5G system, and wherein the network element selection apparatus is a mobility management entity (MME) in the 4G system.

14. The network element selection apparatus according to claim 13, wherein the instructions, when executed, further cause the processor to select a session management function network element in the 4G system as the target session management network element.

15. A non-transitory computer storage medium, wherein the computer storage medium stores a computer instruction, and when the computer instruction is executed, a processor of a network element selection apparatus is caused to:
receive a first message from a terminal device, wherein the first message requests establishing a session;
in response to the first message, determine a target session management function network element based on a capability of the terminal device and subscription information of the terminal device; and
select a co-located session management function network element as the target session management network element if the terminal device supports a first communications system and a second communications system and if the subscription information of the terminal device indicates that a data network identity corresponding to the session supports interworking with a fourth generation (4G) system, wherein the first communications system is a fifth generation (5G) system, the second communications system is the 4G system, and wherein the network element selection apparatus is an access and mobility management function (AMF) network element in the 5G system.

16. A non-transitory computer storage medium, wherein the computer storage medium stores a computer instruction, and when the computer instruction is executed, a processor of a network element selection apparatus is caused to:
receive a first message from a terminal device, wherein the first message requests establishing a session;
in response to the first message, determine a target session management function network element based on a capability of the terminal device and subscription information of the terminal device; and
refrain from selecting a co-located session management function network element as the target session management network element if the terminal device supports a first communications system and a second communications system and if the subscription information indicates that a data network name (DNN) of the session does not support interworking with a fourth generation (4G) system, wherein the first communications system is a fifth generation (5G) system, wherein the second communications system is the 4G system, and wherein the network element selection apparatus is an access and mobility management function (AMF) network element in the 5G system.

17. The non-transitory computer storage medium according to claim 16, wherein when the computer instruction is executed, the processor is further caused to select a session management function network element in the 5G system as the target session management network element.

18. A network element selection system, comprising:
a network element selection apparatus configured to:
send a request message;

receive subscription information of a user equipment (UE);

receive a first message from the UE, wherein the first message requests establishing a session; and in response to the first message, determine a target session management function network element based on a capability of the UE and the subscription information of the UE; and a user data management network element configured to:

receive the request message from the network element selection apparatus; and send the subscription information of the UE to the network element selection apparatus, wherein the network element selection apparatus is configured to select a co-located session management function network element as the target session management network element if the UE supports a first communications system and a second communications system and if the subscription information of the UE indicates that a data network identity corresponding to the session supports interworking with a fourth generation (4G) system.

19. The network element selection system according to claim 18, wherein the network element selection apparatus is an access and mobility management function (AMF) network element, wherein the first communications system is a fifth generation (5G) system, and wherein the second communications system is the 4G system.

20. The network element selection system according to claim 18, wherein the network element selection apparatus is an access and mobility management function (AMF) network element configured to refrain from selecting the co-located session management function network element as the target session management network element if the UE supports the first communications system and the second communications system and if the subscription information indicates that a data network identity of the session does not support interworking with the 4G system, wherein the first communications system is a fifth generation (5G) system, and wherein the second communications system is the 4G system.

21. The network element selection system according to claim 20, wherein the AMF network element is further configured to select a session management function network element in the 5G system as the target session management network element.

22. The network element selection system according to claim 18, wherein the network element selection apparatus is a mobility management entity (MME) network element.

23. The network element selection system according to claim 18, wherein the network element selection apparatus is a mobility management entity (MME) network element, wherein the MME network element is configured to refrain from selecting the co-located session management function network element as the target session management network element if the UE supports the first communications system and the second communications system and if the subscription information indicates that the data network identity of the session does not support interworking with a fifth generation (5G) system, wherein the first communications system is the 4G system, and wherein the second communications system is the 5G system.

24. The network element selection system according to claim 23, wherein the MME network element being configured to refrain from selecting the co-located session management function network element as the target session management network element comprises the MME network element being configured to select a session management function network element in the 4G system as the target session management network element.

25. The network element selection system according to claim 18, wherein the network element selection apparatus is configured to send a second message to the target session management function network element, and wherein the target session management function network element is configured to determine a policy control network element and a charging system based on the second message.

26. A network element selection method, comprising:

sending, by a network element selection apparatus, a request message to a user data management network element;

receiving, by the user data management network element, the request message;

sending, by the user data management network element, subscription information of a terminal device to the network element selection apparatus in response to the request message;

receiving, by the network element selection apparatus, the subscription information of the terminal device from the user data management network element;

receiving, by the network element selection apparatus, a first message from the terminal device, wherein the first message requests establishing a session; and in response to the first message, determining, by the network element selection apparatus, a target session management function network element based on a capability of the terminal device and the subscription information of the terminal device, wherein the network element selection apparatus is configured to select a co-located session management function network element as the target session management network element if the terminal device supports a first communications system and a second communications system and if the subscription information of the terminal device indicates that a data network identity corresponding to the session supports interworking with a fourth generation (4G) system.

27. The network element selection method according to claim 26, wherein the network element selection apparatus is an access and mobility management function (AMF) network element, wherein the first communications system is a fifth generation (5G) system, and wherein the second communications system is the 4G system.

28. The network element selection method according to claim 26, wherein the network element selection apparatus is an access and mobility management function (AMF) network element, wherein determining the target session management function network element comprises refraining, by the AMF network element, from selecting the co-located session management function network element as the target session management network element if the terminal device supports the first communications system and the second communications system and if the subscription information indicates that the data network identity of the session does not support interworking with the 4G system, wherein the first communications system is a fifth generation (5G) system, and wherein the second communications system is the 4G system.

29. The network element selection method according to claim 28, wherein refraining, by the AMF network element, from selecting the co-located session management function network element as the target session management network element comprises selecting, by the AMF network element, a session management function network element in the 5G system as the target session management network element.

30. The network element selection method according to claim 26, wherein the network element selection apparatus is a mobility management entity (MME) network element, wherein determining the target session management function network element comprises selecting, by the MME network element, the co-located session management function network element as the target session management network element if the terminal device supports the first communications system and the second communications system and if the subscription information of the terminal device indicates that the data network identity corresponding to the session supports interworking with a fifth generation (5G) system, wherein the first communications system is the 4G system, and wherein the second communications system is the 5G system.

31. The network element selection method according to claim 26, wherein the network element selection apparatus is a mobility management entity (MME) network element, wherein determining the target session management function network element comprises refraining, by the MME network element, from selecting the co-located session management function network element as the target session management network element if the terminal device supports the first communications system and the second communications system and if the subscription information indicates that the data network identity of the session does not support interworking with a fifth generation (5G) system, wherein the first communications system is the 4G system, and wherein the second communications system is the 5G system.

32. The network element selection method according to claim 31, wherein refraining, by the MME network element, from selecting the co-located session management function network element as the target session management network element comprises selecting, by the MME network element, a session management function network element in the 4G system as the target session management network element.

33. The network element selection method according to claim 26, further comprising:
   sending, by the network element selection apparatus, a second message to the target session management function network element; and
   determining, by the target session management function network element, a policy control network element and a charging system based on the second message.

* * * * *

UNITED STATES PATENT AND TRADEMARK OFFICE
CERTIFICATE OF CORRECTION

PATENT NO. : 10,856,218 B2  
APPLICATION NO. : 16/584242  
DATED : December 1, 2020  
INVENTOR(S) : Yao It is certified that error appears in the above-identified patent and that said Letters Patent is hereby corrected as shown below:

In the Claims

Claim 5, Column 37, Line 35: "(MIME)" should read "(MME)"

Claim 5, Column 37, Line 38: "MIME" should read "MME"

Claim 13, Column 39, Line 61: "terminal device;" should read "terminal device; and"

Signed and Sealed this  
Nineteenth Day of January, 2021

Andrei Iancu  
*Director of the United States Patent and Trademark Office*